US008750667B2

(12) United States Patent
Le Dissez

(10) Patent No.: US 8,750,667 B2
(45) Date of Patent: Jun. 10, 2014

(54) MODULAR SYSTEM AND METHODS FOR CONNECTING AN EXTERNAL COMMUNICATION NETWORK TO A USER NETWORK OF A BUILDING

(75) Inventor: Arnaud Le Dissez, Milan (IT)

(73) Assignee: Prysmian S.p.A., Milan (IT)

( * ) Notice: Subject to any disclaimer, the term of this patent is extended or adjusted under 35 U.S.C. 154(b) by 674 days.

(21) Appl. No.: 12/676,829

(22) PCT Filed: Sep. 6, 2007

(86) PCT No.: PCT/IT2007/000616
§ 371 (c)(1),
(2), (4) Date: May 19, 2010

(87) PCT Pub. No.: WO2009/031172
PCT Pub. Date: Mar. 12, 2009

(65) Prior Publication Data
US 2010/0310221 A1    Dec. 9, 2010

(51) Int. Cl.
*H04Q 1/02* (2006.01)
*G02B 6/44* (2006.01)

(52) U.S. Cl.
CPC .............. *G02B 6/4452* (2013.01); *H04Q 1/028* (2013.01); *H04Q 2201/04* (2013.01); *H04Q 1/023* (2013.01)
USPC ........................................... 385/135; 385/14

(58) Field of Classification Search
USPC .................................................... 385/135, 14
See application file for complete search history.

(56) References Cited

U.S. PATENT DOCUMENTS 5,402,515 A    3/1995    Vidacovich et al.
5,497,444 A *  3/1996    Wheeler ...................... 385/135
(Continued)

FOREIGN PATENT DOCUMENTS

EP    1626300 A1 *    2/2006    ............... G02B 6/44
EP    1 626 300 B1    1/2008
(Continued)

OTHER PUBLICATIONS

Notification of the First Office Action dated Nov. 23, 2011 from the Patent Office of the People's Republic of China in corresponding Chinese Patent Application No. 200780101034.8.
(Continued)

*Primary Examiner* — Kaveh Kianni
(74) *Attorney, Agent, or Firm* — Finnegan, Henderson, Farabow, Garrett & Dunner, L.L.P.

(57) ABSTRACT

A modular system for the connection of an external communication network to a user network of a building includes: at least one user module including: i) at least one passage opening of a connection cable of the user network including a plurality of optical fibers associated with respective users and ii) a plurality of adapters associated with respective optical fibers of the connection cable of the user network, and at least one operator module including: i) at least one inlet opening of at least one connection cable to the external communication network including a plurality of optical fibers and ii) at least one outlet opening of a plurality of fiber optic connection elements connected to the external communication network and provided with a connector at a terminal end thereof. The user module and the operator module are structurally independent from each other and the external communication network is operatively associated with the user network by means of a connection of the connectors of the fiber optic connection elements with respective selected adapters of the user module.

55 Claims, 9 Drawing Sheets

(56) References Cited

U.S. PATENT DOCUMENTS

| | | | |
|---|---|---|---|
| 5,975,769 A * | 11/1999 | Larson et al. | 385/53 |
| 6,250,816 B1 * | 6/2001 | Johnston et al. | 385/53 |
| 7,295,747 B2 * | 11/2007 | Solheid et al. | 385/135 |
| 7,333,708 B2 * | 2/2008 | Blackwell et al. | 385/135 |
| 7,416,347 B2 * | 8/2008 | Livingston et al. | 385/53 |
| 2001/0036351 A1 * | 11/2001 | Fritz | 385/135 |
| 2005/0175307 A1 * | 8/2005 | Battey et al. | 385/135 |
| 2006/0275007 A1 | 12/2006 | Livingston et al. | |
| 2007/0047894 A1 * | 3/2007 | Holmberg et al. | 385/135 |
| 2007/0206780 A1 * | 9/2007 | Kerry et al. | 379/413.02 |
| 2008/0013957 A1 * | 1/2008 | Akers et al. | 398/115 |
| 2008/0124038 A1 * | 5/2008 | Kowalczyk et al. | 385/135 |
| 2008/0131132 A1 * | 6/2008 | Solheid et al. | 398/117 |

FOREIGN PATENT DOCUMENTS

| | | | | |
|---|---|---|---|---|
| JP | 9-5533 | 1/1997 | | |
| WO | WO 95/20175 | 7/1995 | | |
| WO | WO 9520175 A1 * | 7/1995 | | G02B 6/44 |
| WO | WO 2004/086112 A1 | 10/2004 | | |

OTHER PUBLICATIONS

Communication pursuant to Article 94(3) EPC dated Nov. 28, 2011 from the European Patent Office in corresponding European Patent Application No. 07 857 670.6-2216.

International Search Report from the European Patent Office for International Application No. PCT/IT2007/000616, mailed Jun. 11, 2008.

Communication pursuant to Article 94(3) EPC. issued by the European Patent Office in corresponding European Application No. 07 827 670.6-2217, dated Oct. 9, 2012, 4 pages.

Extended European Search Report issued Feb. 21, 2013 in counterpart European Application No. EP 12 18 7832.

* cited by examiner

MODULAR SYSTEM AND METHODS FOR CONNECTING AN EXTERNAL COMMUNICATION NETWORK TO A USER NETWORK OF A BUILDING

CROSS REFERENCE TO RELATED APPLICATION

This application is a national phase application based on PCT/IT2007/000616, filed Sep. 6, 2007, the content of which is incorporated herein by reference.

BACKGROUND OF THE INVENTION

The present invention relates to the field of communications and, more particularly, to systems and devices for connecting an external fibre optics communication network of telephony, data and/or video to a user network of a building including fibre optic cabling.

More particularly, the present invention relates to a modular system and to a modular assembly for connecting an external communication network to a user network of a building, to connection modules of said modular assembly, as well as to methods for carrying out the aforementioned connection both ex-novo and in the presence of an already operative cabling of other operators of the external communication network.

Within the framework of the present description and in the following claims, the term "external communication network" is used to indicate a complex of fibre optic cables and devices, of passive type (PON—Passive Optical Network), of active node type or of mixed passive and active node type, forming an architecture capable of connecting one or more telephone exchange cabinets to several buildings.

Within the framework of the present description and in the following claims, the term "user network of a building", is used to indicate a complex of fibre optic cables and devices forming an architecture extending in a building and capable of connecting several users to a distribution apparatus connected in turn to the external communication network.

RELATED ART

Within the field of modern communication systems and together with the rapid growth of the so-called broadband services provided by one or more operators of an external communication network, a progressive implementation is underway of fibre optic cablings which allow to effectively transport the quantity of data necessary for such services (for example, a telephone, data and/or video service) to the final user.

Within the framework of this widespread cabling action, known in the field with the acronym of FTTH (Fibre To the Home) and together with the growth of the number of operators capable of offering the aforementioned broadband services and which share the same external communication network, the need has arisen to allow various operators to connect their own network to one or more users of buildings with several dwelling units (known in the field with the acronym of MDU—Multi Dwelling Unit) provided with their own internal fibre optic network or user network.

All this should occur not only at the time of making the user network of the building and/or at the time of the first connection of a user with the external communication network by means of a given service provider, but also in subsequent times, allowing in particular a different operator to replace the preceding operator in providing telephone, data or video services.

In order to satisfy this need, a distribution box is generally used which is generally installed in the basement of the building and which is internally provided with at least one user board by means of which a connection between the fibres of a connection cable of the user network associated to each user and the fibres of a connection cable to the external communication network is established and provided with an operator board from which the fibres of the aforementioned connection cable branch out to the external network.

Such distribution boxes, however, have the drawback of making difficult the connection of different operators to different users of the same building, in particular when an operator is taken over by a different operator in the supply of services to a user. The various operators, in fact, are nowadays necessarily compelled to interfere with the connections previously made by other operators within the same distribution box, in order to gain access to the user board.

In order to overcome at least in part this drawback, some service operators have adopted the procedure of installing in the building a distribution box of their own, provided with its own user board and with its own operator board, so as not to operate in the distribution box of other operators, but with the drawbacks of a considerable increase of the costs, of an undesired increase of the used spaces and of the need of manpower for the connection.

SUMMARY OF THE INVENTION

According to the present invention, the Applicant has perceived the need to improve the connection operations of a number of service operators who share an external communication network to one or more users of a building with multi dwelling units and provided with its own internal fibre optic network, in terms of simplicity and quickness of connection, achieving at the same time a substantial reduction of costs and required labour.

More particularly, according to a first aspect, the present invention relates to a modular system for connecting an external communication network to a user network of a building, comprising:

A) at least one user module comprising:
A1) at least one passage opening of a connection cable of said user network, said cable comprising a plurality of optical fibres associated to respective users;
A2) a plurality of adapters associated to respective optical fibres of said connection cable of the user network;
B) at least one operator module comprising:
B1) at least one inlet opening of at least one connection cable to said external communication network, said cable comprising a plurality of optical fibres;
B2) at least one outlet opening of a plurality of fibre optic connection elements connected to the external communication network, said connection elements being provided with a connector at a terminal end thereof;
wherein said at least one user module and said at least one operator module are structurally independent from each other and
wherein said external communication network is operatively associated to the user network by means of a connection of the connectors of the fibre optic connection elements with respective selected adapters of said plurality of adapters of the user module.

Within the framework of the present description and in the following claims, the term "module" is used to indicate a self-contained unit which may be individually handled, provided with a supporting and/or containing casing of optional internal components.

Thanks to the aforementioned combination of features and, in particular, thanks to its modularity characteristics, the system of the invention advantageously allows each operator to use its own operator module, structurally independent from the user module and from other possible operator modules of competing operators, and to establish a connection with each single user of a building in a simple and quick manner by connecting the fibre optic connection elements of its own module with respective selected adapters of the user module.

The connection to a selected user, moreover, occurs in a quick manner thanks to the presence of a number of adapters, each associated to the optical fibre of a certain user and in which the connectors of the fibre optic connection elements coming out from the operator module can be inserted.

Advantageously, this quick and easy connection can be carried out both in case of a brand new connection, for example during the construction of a building or when a certain dwelling unit is occupied by a user, and when a service operator, which one or more users have decided not to use any longer as provider, is taken over by another operator.

In this latter case, and as will be better apparent in the following description, in fact, the incoming operator can be connected to the user(s) without interfering with a pre-existing operator module by:
 i) providing a structurally independent operator module of its own, which will be added to the modular system already in place,
 ii) associating to such a new operator module its own connection cable to the external communication network and its own plurality of fibre optic connection elements provided with a connector at a terminal end thereof, and
 iii) connecting the fibre optic connection elements to the user module once the connection elements associated to the operator module of the previous service operator have been disconnected.

In a preferred embodiment, the modular system of the invention further comprises at least one patching channel adapted to receive at least one and preferably all the fibre optic connection elements of said plurality of connection elements coming out from the operator module, which patching channel extends at least in part in the aforementioned modules.

Advantageously, such a patching channel constitutes an element capable of operatively associating in an effective manner the user module(s) and the operator module(s) of the modular system, housing within its inner space and at the same time protecting the fibre optic connection elements coming out from the operator module(s).

Within the framework of this preferred embodiment, the user module(s) and the operator module(s) are provided at an end portion thereof with a pair of substantially coaxial openings formed in respective lower and upper walls of the modules, in a manner such that the aforementioned patching channel is defined at least in part by said substantially coaxial openings.

In this way, it is advantageously possible to define such a patching channel in a simple and practical manner, in particular when the modules are mounted adjacent to each other, preferably on top of each other according to a substantially vertical arrangement.

Preferably, each of the substantially coaxial openings formed in the lower and upper walls of the operator module constitutes the aforementioned outlet opening from the module of the fibre optic connection elements connected to the external communication network.

Within the framework of the present description and in the following claims, the terms: lower, upper, lateral, rear and front are referred to the position of the connection system when in use.

Preferably, the user module(s) and the operator module(s) further comprise a slit formed in said lower and upper walls of the modules and extending between said openings and a peripheral edge of such walls.

Advantageously, this slit forms a passage channel which allows the lateral insertion of the fibre optic connection elements coming out from the operator module in the patching channel in a simple and quick manner, without having to interfere with possible pre-existing modules in the modular system.

In a preferred embodiment, the user module(s) and the operator module(s) of the modular connection system of the invention are mounted on a supporting wall on top of each other.

Advantageously, the modular system achieves in this way a substantially vertical configuration which facilitates its installation operations, for example on a vertical wall of the building.

Within the framework of this preferred embodiment, the modules of the modular system can be mounted on top of each other either directly on a suitable wall of the building, or on a planar supporting panel which facilitates the installation operations.

Within the framework of this preferred embodiment, furthermore, the user module(s) and the operator module(s) are mutually associated at respective facing walls thereof, preferably at the upper/lower walls, so as to accomplish the aforementioned superimposed installation on a supporting wall.

In this way and when the user module and the operator module are provided with the aforementioned substantially coaxial openings, the aforementioned patching channel between the modules is completely enclosed within the modular system, thereby achieving an effective protection of the fibre optic connection elements coming out from the operator module.

In a preferred embodiment, the user module(s) and the operator module(s) are mutually associated by means of at least one mechanical coupling device.

In this way, it is advantageously possible to increase the sturdiness characteristics of the modular system by connecting the modules together in a stable manner.

Within the framework of this preferred embodiment, the aforementioned mechanical coupling device comprises a bayonet type coupling which can be constituted, for example, by an appropriately shaped slot, formed for example in the lower wall of the modules, cooperating with an appropriately shaped pin extending from the upper wall of the modules when the modules are associated to each other.

The mutual association between the modules of the modular system can be carried but with other mechanical coupling devices (for example screws, bolts) or other equivalent coupling techniques, for example by gluing, which can be easily selected by a man skilled in the art.

In a preferred embodiment, the adapters of the user module are associated to respective optical fibres of the connection cable of the user network by means of a plurality of pigtails The use of pigtails allows to endow the user network with one or more points of flexibility, i.e. points of separation which allow to divide the user network into a plurality of separate, independent sectors. This feature is particularly advantageous since it allows to achieve an easier handling of the user network, for example in case of failure.

Within the framework of this preferred embodiment, the pigtails are preferably associated to the optical fibres of the connection cable of the user network, by splicing the fibres in a mechanical manner or by means of butt splicing according to techniques known to those skilled in the art.

Within the framework of this preferred embodiment, the user module further comprises at least one support tray of splices between the optical fibres of the connection cable of the user network and respective pigtails.

In this way, it is advantageously possible to adequately protect the splices between the optical fibres of the connection cable of the user network and the pigtails, for example by arranging the splices in suitable housing seats of the tray so as to facilitate possible subsequent maintenance or repair operations.

Preferably, the user module comprises a plurality of support trays of the splices, preferably stacked on each other so as to increase the overall number of users which may be connected by means of a single user module.

Preferably, the support trays of the splices is(are) rotatably mounted in the user module, so as to facilitate the operations of the operator on the underlying structures, such as for example the insertion in the module of the fibres extracted from the connection cable of the user network or of the pigtails, as well as the insertion of the splices into an underlying tray in the case of a number of stacked trays.

Preferably, the user module is also provided in this case with a locking device adapted to maintain the support trays of the splices in a raised position with respect to a rear wall of the user module, so as to facilitate the aforementioned operations of the operator in case of installation/maintenance.

For the purposes of the invention, this locking device can have any suitable configuration capable of interacting in a removable manner with the support tray(s) of the splices; preferably, the locking device comprises a slidable bolt associated to the tray(s) and cooperating in abutment relationship with a fixed structure, for example a supporting arm of the tray(s), associated to the user module.

In a preferred embodiment, the user module further comprises at least one element for storing the unused connectors of the fibre optic connection elements coming out from the operator module(s).

In this way, it is advantageously possible to avoid that the fibre optic connection elements not connected to the adapters of the user modules can be left free to move within the user module, with the possibility that they may get dirty or interfere with the interventions of an operator on the module.

Within the framework of this preferred embodiment, the aforementioned storage element may comprise a plurality of adapters not associated to the optical fibres of the connection cable of the user network or, alternatively, it may comprise "false" adapters lacking the inner ferrule ("dummy adapters"), in which the connectors of the unused fibre optic connection elements are inserted.

In a preferred embodiment, the user module further comprises at least one winding element, preferably a plurality of winding elements, for the optical fibres of the connection cable of the user network and/or for the pigtails when present.

Preferably, the winding elements are shaped in a manner such that the optical fibres of the connection cable of the user network and/or the pigtails housed in the user module cannot undergo direction changes with curvature radii greater than a predetermined minimum value, both in static conditions and in traction conditions induced by handling the optical fibres.

In this way the best protection of the optical fibres is ensured with regard to possible bending during the installation and maintenance steps.

To this end, the winding elements preferably comprise shaped guide fins projecting perpendicularly from one of the walls of the module, for example from the rear wall, and having a curvature radius greater than the minimum predetermined value. Conveniently, such shaped fins are also arranged in such a manner that every fin begins and ends in a direction substantially tangent to the adjacent fins (or to the passage opening of the connection cable of the user network in the module). The minimum curvature radius is consequently ensured also in case of traction of the optical fibres.

Preferably, the predetermined minimum value of the curvature radius is not less than 30 mm; such value being normally tolerated by the optical fibres.

Preferably, furthermore, the shaped guide fins can comprise retention portions perpendicularly projecting from the guide fins, parallel to and spaced from the wall of the module from which the fins are extending. Such retention portions serve to ensure that the optical fibre portions are effectively maintained in position about the shaped guide fins.

In a preferred embodiment, the user module can further comprise a pair of openings formed in respective lower and upper walls of the module, preferably proximate to the passage opening of the connection cable of the user network.

In this way, within the framework of the modular connection system of the invention, it is advantageously possible that optical fibres optionally extracted from the connection cable of the user network and exceeding the containment capacity of a single user module can be routed into another user module, which can be mounted either above or below the module concerned.

In a preferred embodiment of the modular system according to the invention, the fibre optic connection elements coming out from the operator module(s) can be constituted at least in part by respective connection cables to the external communication network.

In a preferred embodiment of the modular system according to the invention, moreover, the connection cable to the external communication network can form part of the external network and, as such, belong to a given service operator.

In this way, an operator who expects to have a small number of clients in a given building, for example in case of take over, can advantageously directly use one or more connection cables to the external communication network or the same cables of its own network—previously pre-connectorised at one end—to carry out the connection with the user module, thereby avoiding operations of optical fibre splicing and reducing the installation costs and times.

In a preferred embodiment, the fibre optic connection elements coming out from the aforementioned at least one operator module are connected to the connection cable to the external communication network by means of a plurality of pigtails associated to respective optical fibres of the connection cable.

In this way, it is advantageously possible to achieve a stable connection between the optical fibres of the connection cable to the external communication network and the fibre optic connection elements coming out from the operator module upon connection of such optical fibres to the aforementioned pigtails which then constitute the fibre optic connection elements and which are appropriately spliced to the fibres in a mechanical manner or by means of butt splicing according to techniques known to those skilled in the art.

Similarly to what has been illustrated above with reference to the user module, furthermore, the use of pigtails advantageously allows to endow the system in its connection to the external communication network with one or more points of flexibility, i.e. points of separation which allow to split the connection to the external communication network in a plurality of separate and independent sectors. This aspect is particularly advantageous since it allows an easier handling of the network, for example in case of failure.

Within the framework of this preferred embodiment, the operator module further comprises at least one support tray, preferably a plurality of stacked trays, of splices between the optical fibres of the connection cable to the external communication network and respective pigtails.

Preferably, the support tray(s) of the splices is(are) rotatably mounted in the operator module, which preferably comprises a locking device adapted to maintain the support tray(s) of the splices in a raised position with respect to a rear wall of the operator module.

Preferably, these preferred configurations of the operator module are entirely analogous to those described with reference to the user module and achieve the advantageous technical effects described above.

In a preferred alternative embodiment, the fibre optic connection elements coming out from the operator module can be connected to the connection cable to the external communication network by means of at least one splitter, i.e. by means of an optical device adapted to split the optical fibres of the connection cable to the external communication network into a plurality of split optical fibres. Thus, for example, each optical fibre of the connection cable to the external communication network can be split into 2, 4, 8, 16, 32 or 64 split optical fibres, each forming part of a respective fibre optic connection element.

In a preferred embodiment, the operator module further comprises at least one element for storing a portion of the fibre optic connection elements.

Also in this case, such storage element attains similar advantages to those illustrated above with reference to the user module.

Within the framework of this preferred embodiment, the storage element can comprise a support, preferably substantially cylindrical, extending from a separating wall arranged between respective lower and upper walls of the operator module.

Preferably, such substantially cylindrical support consists of a plurality of shaped guide fins projecting perpendicularly from the aforementioned separating wall of the module and having a curvature radius greater than the aforementioned predetermined minimum value (for example 30 mm) in order not to cause undesired fibre bending.

In a preferred embodiment, the storage element can comprise, in addition to or in substitution of the support extending from the separating wall, a substantially comb-shaped support adapted to support the pigtails associated to the optical fibres of the connection cable to the external communication network.

Preferably, the substantially comb-shaped support is perpendicularly extending from the rear wall of the operator module, allowing in this way to store the pigtails within the operator module, thereby avoiding that they may interfere with other pigtails outside of the module in case of subsequent installations.

In a preferred embodiment, the operator module further comprises at least one winding element for the optical fibres of the connection cable to the external communication network and/or for the pigtails.

Advantageously, this winding element can have the preferred configurations and achieve the technical effects described above with reference to the user module.

In a preferred embodiment, the operator module further comprises a locking device of the connection cable to the external communication network, positioned proximate to the inlet opening of such a cable.

In this way, it is advantageously possible to avoid that damages may occur to the optical fibre or to the splices housed in the operator module in case of accidental tractions of the connection cable to the external communication network, which tractions may take place, for example, during street maintenance operations.

In a preferred embodiment, the operator module can further comprise at least one guide element for the fibre optic connection elements coming out from the operator module.

Preferably, this guide element is shaped in such a way that the optical fibres of the fibre optic elements coming out from the operator module cannot undergo direction changes with curvature radii greater than the aforementioned predetermined minimum value, both in static conditions and in traction conditions induced by handling the elements.

Preferably, furthermore, this guide element is formed by guide fins which are similar to those described above with reference to the winding elements of the user module and of the operator module, attaining the same advantageous technical effects.

According to a further aspect thereof, the invention also relates to a modular assembly for connecting an external communication network to a user network of a building, comprising:

A) at least one user module comprising:

A1) at least one passage opening of a connection cable of said user network;

A2) a plurality of adapters associable to respective optical fibres of said connection cable of the user network;

B) at least one operator module, structurally independent from said at least one user module, comprising:

B1) at least one inlet opening of at least one connection cable to said external communication network;

B2) at least one outlet opening of a plurality of fibre optic connection elements connected to the external communication network, said connection elements being associable to the adapters of said at least one user module;

wherein said modules are operatively associated by means of at least one patching channel adapted to receive at least one of said plurality of connection elements and extending at least in part in said modules.

Advantageously, the modular assembly of the invention provides a structure which allows to achieve the modular connection system described above, accomplishing all of its technical effects, in particular the possibility for different operators of connecting to different users of a same building in a simple and quick manner and without interfering with the operator modules of other competing operators.

Features of the modular assembly according to the invention, already described in detail with reference to the modular connection system obtainable therefrom, include those described below.

In the modular assembly said at least one user module and said at least one operator module may be provided at an end portion thereof with a pair of substantially coaxial openings formed in respective lower and upper walls of the modules and said at least one patching channel may be defined at least in part by said substantially coaxial openings.

Said at least one user module and said at least one operator module may further comprise a slit formed in said lower and upper walls of the modules and extending between said openings and a peripheral edge of said walls.

Said at least one user module and said at least one operator module may be mounted on a supporting wall on top of each other, and said at least one user module and said at least one operator module may be mutually associated at respective facing walls thereof, wherein said at least one user module and said at least one operator module may be operatively associated by means of at least one mechanical coupling device.

The at least one mechanical coupling device may comprise a bayonet type coupling.

In the modular assembly said at least one user module may comprise a plurality of pigtails optionally associated with respective adapters of said plurality of adapters.

In certain embodiments, the at least one user module may further comprise at least one support tray for splices between the optical fibres of the connection cable of the user network and said pigtails, wherein said support tray of the splices may be rotatably mounted in said at least one user module, wherein said at least one user module may further comprise a locking device and may be adapted to maintain said at least one support tray of the splices in a raised position with respect to a rear wall of the user module.

Furthermore, in the modular assembly said at least one user module may further comprise at least one storage element for storing the fibre optic connection elements associable to the adapters of said at least one user module, wherein said at least one storage element may comprise a plurality of adapters or a plurality of "dummy" adapters.

In other embodiments of the modular assembly, said at least one user module may further comprise at least one winding element for optical fibres and/or for pigtails, and said at least one user module may further comprise a pair of openings formed in respective lower and upper walls of the module.

In the modular assembly, said at least one operator module may comprise a plurality of pigtails adapted to be associated to respective optical fibres of said connection cable to the external communication network, wherein said at least one operator module may further comprise at least one support tray for splices between the optical fibres of the connection cable to the external communication network and said pigtails, wherein said at least one support tray of the splices may be rotatably mounted in said at least one operator module, and wherein said at least one operator module may further comprise a locking device adapted to maintain said at least one support tray of the splices in a raised position with respect to a rear wall of the operator module.

In still other aspects of the modular assembly, said at least one operator module may comprise at least one splitter for connecting the fibre optic connection elements to the external communication network; and said at least one operator module may further comprise at least one storage element for storing a portion of the fibre optic connection elements, wherein said at least one storage element may comprise a support extending from a separating wall arranged between respective lower and upper walls of the operator module.

At least one storage element of the modular assembly may comprise a substantially comb-shaped support adapted to support the pigtails adapted to be associated to the optical fibres of the connection cable to the external communication network.

At least one operator module of the modular assembly may further comprise at least one winding element for the optical fibres of the connection cable to the external communication network and/or for the pigtails.

At least one operator module of the modular assembly may further comprise a locking device of the connection cable to the external communication network positioned proximate to said at least one inlet opening of said connection cable; and said at least one operator module may further comprise at least one guide element for the fibre optic connection elements.

According to a further aspect thereof, the invention relates to a user module for use in a modular system for connecting an external communication network to a user network of a building, comprising:
  at least one passage opening of a connection cable of said user network;
  a plurality of adapters associable to respective optical fibres of said connection cable of the user network;
  at least one patching channel adapted to receive at least one connection element of a plurality of fibre optic connection elements connected to the external communication network and open on said plurality of adapters.

Advantageously, the user module of the invention constitutes a modular element structurally independent and which may be separately handled, by means of which it is possible to obtain the modular connection system described above, achieving all its advantageous technical effects, in particular that of permitting a quick and easy connection of an incoming service operator to selected clients served by the user network of the building by simply disconnecting and reconnecting the fibre optic connection elements to the adapters of the user module accessible from the patching channel.

Included in the features of the user module according to the invention, already described in detail with reference to the modular connection system, are those described below.

The user module may comprise a pair of substantially coaxial openings formed in respective lower and upper walls of the module at an end portion thereof, wherein said at least one patching channel may be defined at least in part by said substantially coaxial openings; and the user module may further comprise a slit formed in said lower and upper walls of the module and extending between said openings and a peripheral edge of said walls.

The user module may comprise at least one coupling means adapted to cooperate with respective coupling counter-means for associating the user module to an adjacent module, wherein said coupling means and counter-means may form a bayonet type mechanical coupling device.

In another aspect of the present invention the user module may further comprise a feature as defined in the modular assembly discussed above.

According to a further aspect thereof, the invention relates to an operator module for use in a modular assembly for connecting an external communication network to a user network of a building, comprising:
  at least one inlet opening of at least one connection cable to said external communication network;
  at least one outlet opening of a plurality of fibre optic connection elements connected to the external communication network;
  at least one patching channel adapted to receive at least one connection element of said plurality of fibre optic connection elements connected to the external communication network.

Advantageously, the operator module of the invention provides a modular element structurally independent and which may be separately handled by means of which it is possible to obtain the modular connection system described above, achieving all its advantageous technical effects, in particular that of permitting a quick and easy connection of an incoming service operator to selected clients served by the user network of the building without interfering with a pre-existing operator module of another service operator.

Included in the features of the operator module according to the invention, already described in detail with reference to the modular connection system, are those embodiments described below.

The operator module may comprise a pair of substantially coaxial openings formed in respective lower and upper walls of the module at an end portion thereof, wherein said at least one patching channel may be defined at least in part by said substantially coaxial openings, and may further comprise a slit formed in said lower and upper walls of the module and extending between said openings and a peripheral edge of said walls.

The operator module may also comprise at least one coupling means adapted to cooperate with a respective coupling counter-means for associating the operator module to an adjacent module, wherein said coupling means and counter-means may form a bayonet type mechanical coupling device.

The operator module according to the present invention may further comprise certain features as defined above for the modular assembly.

According to a further aspect thereof, the invention relates to a method for connecting an external communication network to a user network of a building, comprising the steps of:
a) providing at least one user module comprising a plurality of adapters for optical fibre connectors;
b) associating a connection cable of the user network to said at least one user module, said cable comprising a plurality of optical fibres associated to respective selected users;
c) associating the optical fibres of the connection cable of the user network to the adapters of said at least one user module;
d) providing at least one operator module comprising at least one inlet opening of at least one connection cable to the external communication network;
e) associating said at least one connection cable to the external communication network to said at least one operator module, said cable comprising a plurality of optical fibres;
f) associating a plurality of fibre optic connection elements connected to the external communication network and provided with a connector at a terminal end thereof to said at least one operator module;
g) connecting the connectors of the fibre optic connection elements associated to said at least one operator module to respective selected adapters of said plurality of adapters of the user module.

Advantageously, the connection method of the invention attains all the technical effects described above with reference to the modular connection system, in particular:
the possibility for each operator to employ an operator module of its own, structurally independent from the user module and from other possible operator modules of competing operators, and to be connected in a simple and quick manner to each single user of a building by connecting the fibre optic connection elements of its own module to respective selected adapters of the user module;
the possibility for each operator to be connected to different users of a same building without interfering with the operator modules of other competing operators;
the possibility for each operator to be connected to different users of a same building both in the case of a brand new connection, for example during the construction of a building or when a certain dwelling unit is occupied by a user, and when an operator takes over a preceding service operator that one or more users have decided not to use any longer as a service provider.

In a preferred embodiment, the aforementioned step c) of associating the optical fibres of the connection cable of the user network to the adapters of the user module comprises the steps of:
i) providing a plurality of pigtails,
ii) associating the optical fibres of the connection cable of the user network to respective pigtails of said plurality of pigtails, and
iii) associating the pigtails thus obtained to the adapters of said at least one user module.

Within the framework of this preferred embodiment, the optical fibres of the connection cable of the user network are associated to respective pigtails by means of mechanical splices or fused fibre splices obtained by means of butt splicing between the fibres.

Preferably, furthermore, the method according to the invention further comprises the step of housing the aforementioned splices in respective splice housing seats formed in at least one support tray mounted in the user module.

In this way and as described above, it is advantageously possible to adequately protect the splices between the optical fibres of the connection cable of the user network and the pigtails, and to facilitate possible subsequent maintenance or repair operations.

In a preferred embodiment of the method according to the invention, the fibre optic connection elements are constituted at least in part by respective connection cables to the external communication network and the aforementioned step f) comprises the step of associating the connection cables to the operator module.

In a preferred embodiment of the method according to the invention, furthermore, the connection cable to the external communication network can form part of the external network and, as such, it can belong to a given service operator.

In this way and as described above with reference to the modular connection system, an operator who expects to have a small number of clients in a given building, for example in case of a take over, can advantageously directly use one or more connection cables to the external communication network or the same cables of the network of its own—previously pre-connectorised at one end thereof—to carry out the connection with the user module, thereby avoiding splicing operations of the optical fibres and reducing the installation times and costs.

In a preferred embodiment, the aforementioned step f) of associating the operator module to a plurality of fibre optic connection elements connected to the external communication network comprises the step of connecting the fibre optic connection elements to the external communication network by means of at least one splitter.

In this way and as described above with reference to the modular connection system, it is advantageously possible to split a single optical fibre of the connection cable to the external communication network (which could be, as indicated above, a network cable) into a plurality of optical fibres, each associated to a respective fibre optic connection element coming out from the operator module.

In a further preferred embodiment, the aforementioned step f) of associating the operator module with a plurality of fibre optic connection elements connected to the external communication network comprises the steps of:
i) providing a plurality of pigtails, and
ii) associating the optical fibres of the connection cable to the external communication network to respective pigtails of said plurality of pigtails.

Within the framework of this preferred embodiment, the optical fibres of the connection cable to the external communication network are preferably associated to respective pigtails by means of mechanical splices or fused fibre splices obtained by means of butt splicing between the fibres.

In this way and as described above with reference to the modular connection system, it is advantageously possible to obtain a stable connection between the optical fibres of the connection cable to the external communication network and the fibre optic connection elements coming out from the operator module upon connection of such optical fibres to the aforementioned pigtails, which thus constitute the fibre optic connection elements and which are appropriately spliced to the fibres in a mechanical manner or by means of butt splicing according to techniques known to those skilled in the art.

In a preferred embodiment, the method of the invention further comprises the step of housing the aforementioned splices in respective splice housing seats formed in at least one support tray mounted in the operator module.

In this way and as described above with reference to the modular connection system, it is advantageously possible to adequately protect the splices between the optical fibres of the connection cable to the external communication network and the pigtails and to facilitate possible subsequent maintenance or repair operations.

In a preferred embodiment, the method of the invention can further comprise the step of associating a portion of at least one of the fibre optic connection elements associated to the operator module and not connected to an adapter of the user module to at least one storage element of the operator module itself.

In this way it is advantageously possible to keep in a bundled and organised manner the unused fibre optic connection elements.

According to a further aspect thereof, the invention relates to a method for connecting an additional operator of a shared external communication network to a user network of a building, said user network being connected to at least a first operator of said shared external network by means of a modular connection system as described above, said modular connection system including at least a first connection cable to the shared external network associated to at least one operator module of said first operator, the method comprising the steps of:

h) providing at least one further operator module comprising at least one inlet opening for at least one further connection cable to the shared external communication network;
i) associating said at least one further connection cable to the shared external communication network to at least one further operator module, said at least one further connection cable comprising a plurality of optical fibres;
l) associating a plurality of fibre optic connection elements connected to the shared external communication network and provided with a connector at a terminal end thereof to said at least one further operator module;
m) connecting the connectors of the fibre optic connection elements associated to said at least one further operator module to respective selected adapters of said plurality of adapters of a user module of said modular connection system.

Advantageously, this further connection method of the invention achieves all the technical effects described above and in particular:

the possibility for each operator to be connected in a simple and quick manner to different users of a same building without interfering with the operator modules of other competing operators;

the possibility for each operator to be connected to different users of a same building both in case of a brand new connection, for example during the construction of a building or when a certain dwelling unit is occupied by a user, and when an operator replaces a preceding service operator that one or more users have decided not to use any longer as service provider.

In a preferred embodiment, the fibre optic connection elements associated to the further operator module are constituted at least in part by respective further connection cables to the shared external communication network and the aforementioned step 1) comprises the step of associating these further connection cables to the further operator module.

In a preferred embodiment of the method and as described above, the connection cable to the external communication network can form part of the external network and, as such, belong to a given service operator.

In this way, an operator who expects to have a small number of clients in a given building, for example in the case of a take over, can advantageously directly utilise one or more connection cables to the external communication network or the same cables of its own network—previously pre-connectorised at one end thereof—to carry out the connection with the user module, thereby avoiding splicing operations of the optical fibres and reducing the installation times and costs.

In a further preferred embodiment, the aforementioned step 1) of associating a plurality of fibre optic connection elements connected to the shared external communication network to the further operator module, comprises the steps of i) providing a plurality of pigtails, and
ii) associating the optical fibres of said at least one further connection cable to the shared external communication network to respective pigtails of said plurality of pigtails.

Similarly to what has been described above, the optical fibres of the further connection cable to the shared external communication network are preferably associated to respective pigtails by means of mechanical splices or fused fibre splices obtained by means of butt splicing between the fibres.

Preferably, moreover, the method further comprises the step of housing the aforementioned splices in respective splice housing seats formed in at least one support tray mounted in the further operator module.

In this way, it is advantageously possible to achieve the technical effects described above with reference to the connecting system and method of the invention.

In a preferred embodiment, the aforementioned step 1) of associating a plurality of fibre optic connection elements connected to the shared external communication network to the further operator module, comprises the step of connecting the fibre optic connection elements to the connection cable to the shared external communication network by means of at least one splitter.

In this way and as described above, it is advantageously possible to split a single optical fibre of the connection cable to the external communication network (which can be, as indicated above, a network cable) into a plurality of optical fibres, each associated to a respective fibre optic connection element coming out from the operator module.

In a preferred embodiment, within the framework of the method according to this aspect of the invention, the aforementioned step m) of connecting the connectors of the fibre optic connection elements associated to the further operator module to respective selected adapters of said plurality of adapters of the user module of the modular connection system, comprises the steps of:

i) disconnecting at least one of the connectors of the fibre optic connection elements associated to the operator module of the first operator from a respective selected adapter of the user module, and ii) connecting the connector of at least one of the fibre optic connection elements associated to the further operator module to the aforementioned selected adapter of the user module.

In this way, the method of the invention allows each operator to replace, in an easy and quick manner, other competing operators in the supply of services to different users of a same building, without interfering with the operator modules of the previous operators.

Within the framework of this preferred embodiment, the method of the invention further comprises the step of associating the connector of the fibre optic connection elements associated to the operator module of the first operator disconnected from the respective selected adapter of the user module to an adapter of the user module which is not associated to optical fibres of a connection cable of the user network or, alternatively, to a "dummy adapter".

In this way, it is advantageously possible to prevent that the fibre optic connection elements not connected to the adapters of the user module may be left free to move within the user module with the possibility that they can get dirty or interfere with the operations of a worker on the module.

Within the framework of a preferred embodiment, the method of the invention can further comprise the step of associating a portion of at least one of the fibre optic connection elements associated to the further operator module and not connected to an adapter of the user module to at least one storage element of the further operator module.

Within the framework of a further preferred embodiment, the method of the invention can further comprise the step of associating a portion of at least one of the fibre optic connection elements associated to the operator module of the first operator and disconnected from the user module to at least one storage element of the operator module of the first operator.

Preferably, the aforementioned storage elements possess the features and attain advantages similar to those described above with reference to the modular connection system.

Additional features and advantages of the invention will become more clearly apparent from the detailed description of a preferred, but not exclusive, embodiment of a modular system and of a modular connection assembly, as well as of methods for connecting an external communication network to a user network of a building, in accordance with the present invention.

BRIEF DESCRIPTION OF THE DRAWINGS

Such a description will be made hereinafter with reference to the accompanying drawings, given by way of indication and not of limitation, wherein.

DETAILED DESCRIPTION OF THE CURRENTLY PREFERRED EMBODIMENTS

Figure 1:
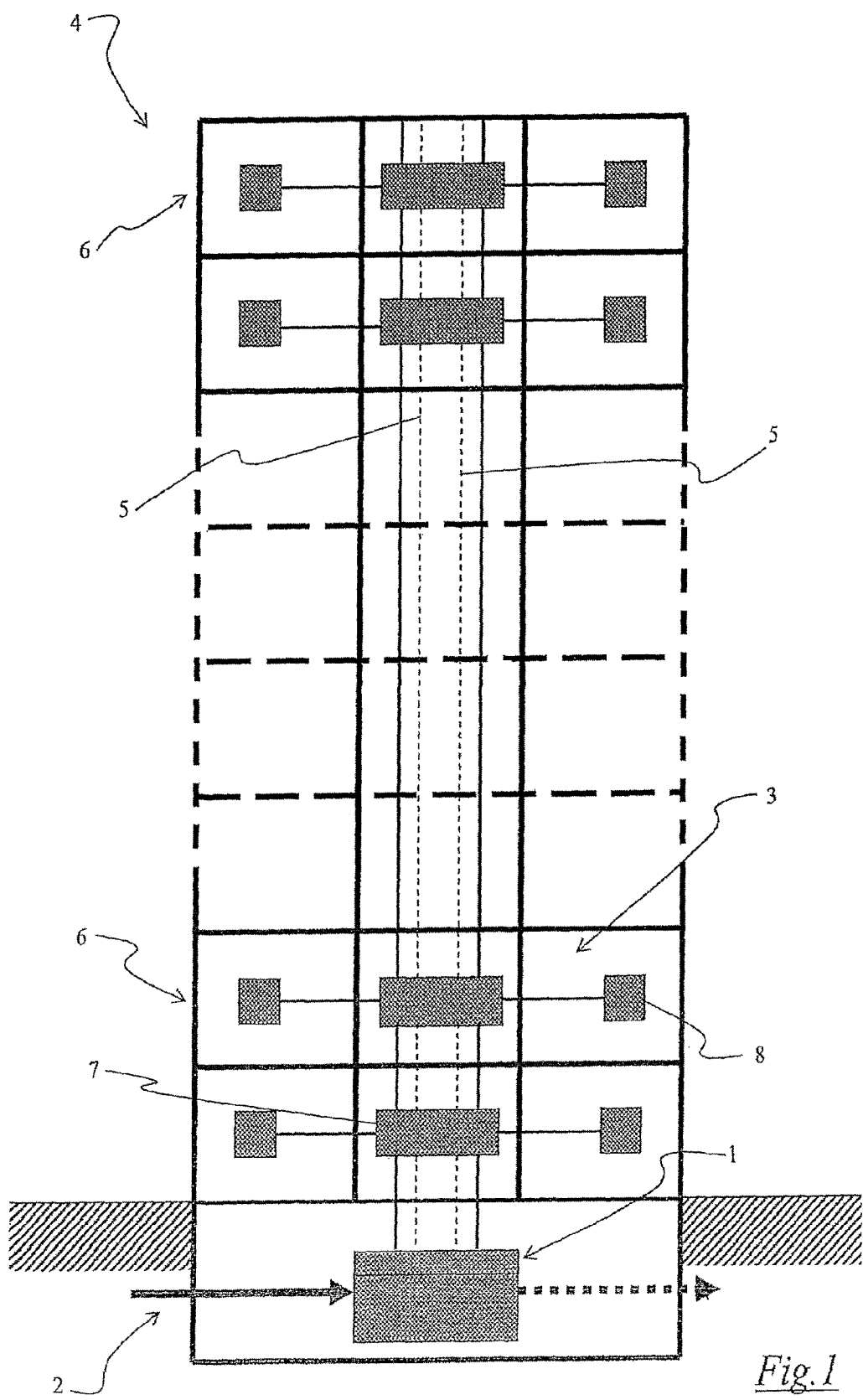
FIG. 1 schematically shows a possible layout of a user network of a building operatively associated to an external communication network by means of a modular connection system according to the present invention.

With reference to FIG. 1, a modular connection system according to a preferred embodiment of the present invention for connecting an external communication network, schematically indicated at 2, to a user network 3 of a building 4, is generally indicated at 1.

Preferably, the external communication network 2 is a network shared by a number of service operator, for example of voice, data and video services.

In the preferred embodiment illustrated in FIG. 1, the user network 3 comprises a pair of connection cables 5, each comprising a plurality of optical fibres associated to respective users, said connection cables 5 extending between the modular connection system 1 positioned for example in a basement of the building 4 and the various dwelling units of the building 4 indicated with the reference 6 in FIG. 1.

The user network 3 also comprises a plurality of riser boxes 7 located at each floor of the building 4, or in specific positions between several floors, for connecting the connection cables 5 (or at least one optical fibre of the connection cables 5) to a user termination box schematically indicated at 8 in FIG. 1.

Within the framework of the user network 3, the optical fibres of the connection cables 5 entering into the riser boxes 7 are connected to the termination boxes 8, for example by splicing such optical fibres to a pigtail which is connected to the termination box 8 or by splicing such optical fibres to a first pigtail, by mechanically splicing the free end of this first pigtail to an end of a second pigtail which is then connected to the termination box 8.

Figure 2:
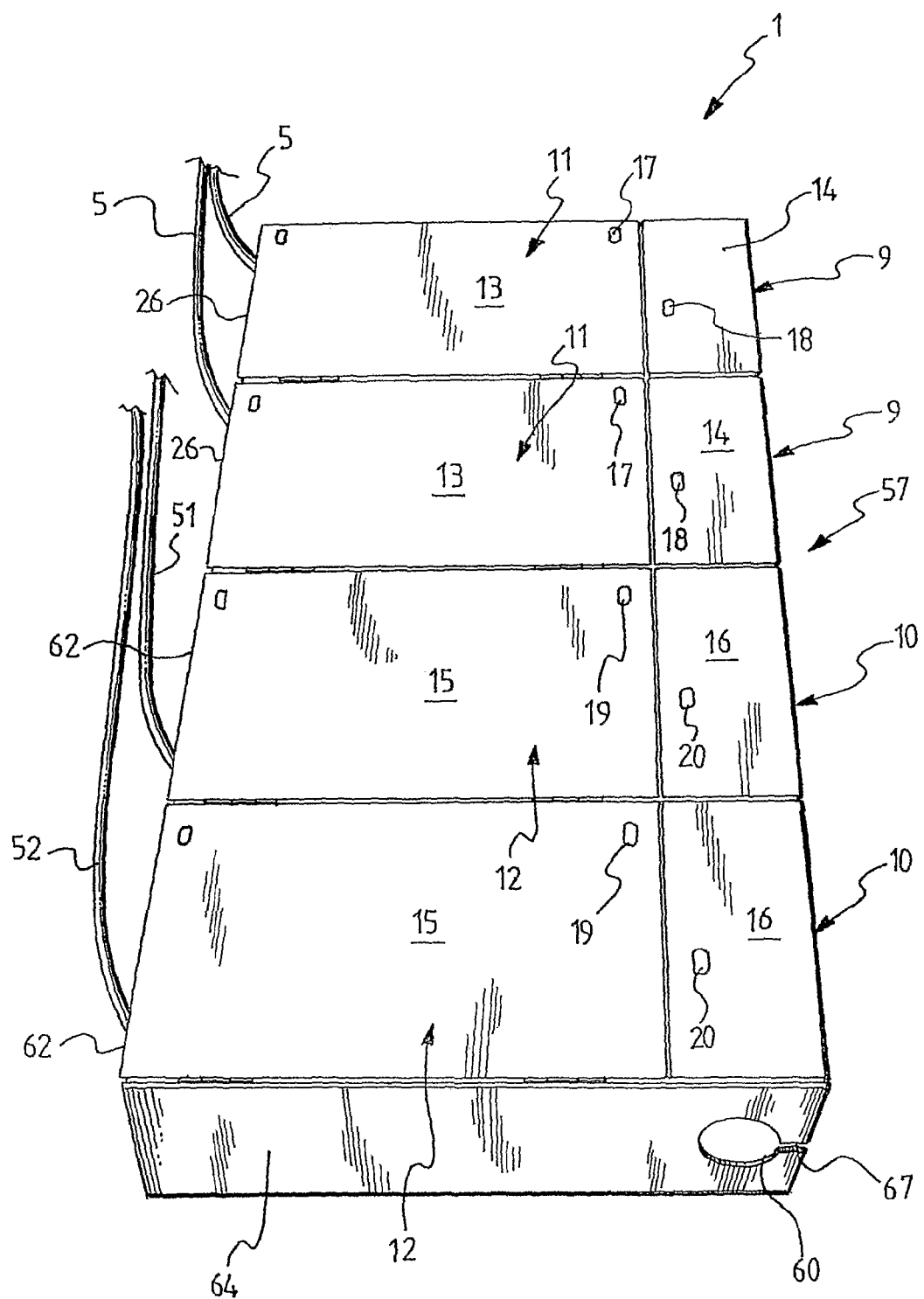
FIG. 2 shows a bottom perspective view of a preferred embodiment of the modular connection system according to the present invention comprising a plurality of user modules and a plurality of operator modules mounted on top of each other.

The modular connection system 1 according to the embodiment illustrated in FIG. 2 comprises a pair of user modules 9 and a pair of operator modules 10 which are structurally independent from each other.

Preferably, the user modules 9 are structurally identical to each other so as to achieve a modular connection system in which various user modules 9 can be interchangeably used and positioned in the most suitable manner according to the connection requirements which one wishes to satisfy.

In a similar manner, also the operator modules 10 are preferably structurally identical to each other, so as to attain the same advantageous technical effects.

In this embodiment, the user modules 9 are connected to the user network 3 of the building 4 and each of them allows to carry out the connection with a predetermined number of users, for example 24 users, while the operator modules 10 are connected to the external communication network 2 and each of them belongs to a service operator connected to the user network 3 by means of the modular connection system 1.

Preferably, the user modules 9 and the operator modules 10 are mounted on top of each other at respective facing walls thereof, for example their upper and lower walls. The user modules 9 and the operator modules 10 are in particular mounted on a supporting wall of the building 4 or on a substantially flat supporting panel (not shown), so as to attain a substantially vertical configuration which facilitates the installation operations of the modular system 1.

As illustrated in FIG. 2, each of the user modules 9 and each of the operator modules 10 comprises a box-shaped body, respectively indicated with the references 11 and 12, provided in turn with a pair of closure doors 13 and 14 and, respectively 15, 16.

The closure doors 13, 14 and 15, 16 are hinged to the box-shaped bodies 11, 12 of the user modules 9 and of the operator modules 10 so as to close respective compartments of the modules, which shall be described hereinbelow.

Figure 3:
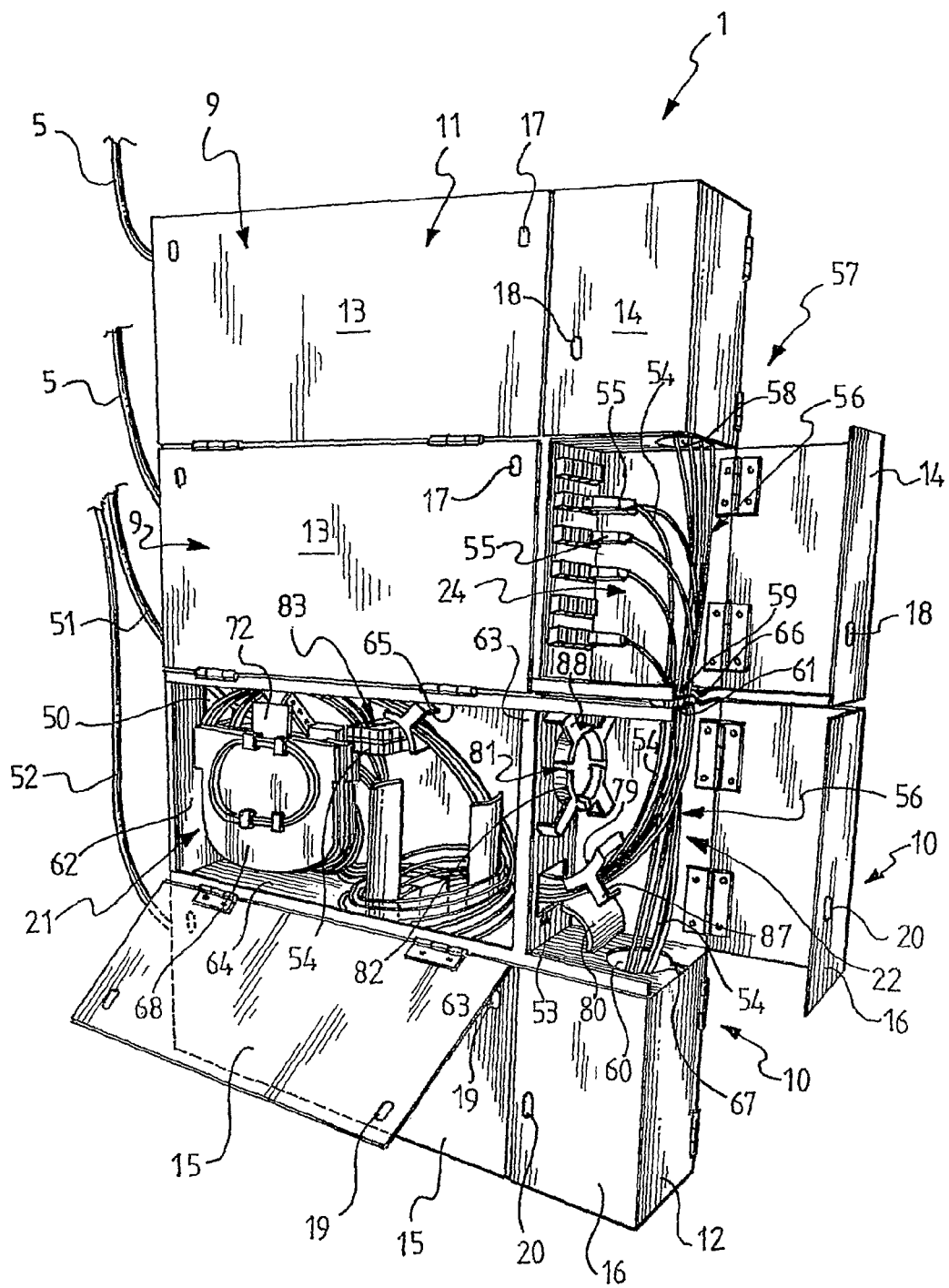
FIG. 3 shows a perspective view of the modular connection system of FIG. 2 with the doors of an operator module and a door of a user module in open position.
Figure 4:
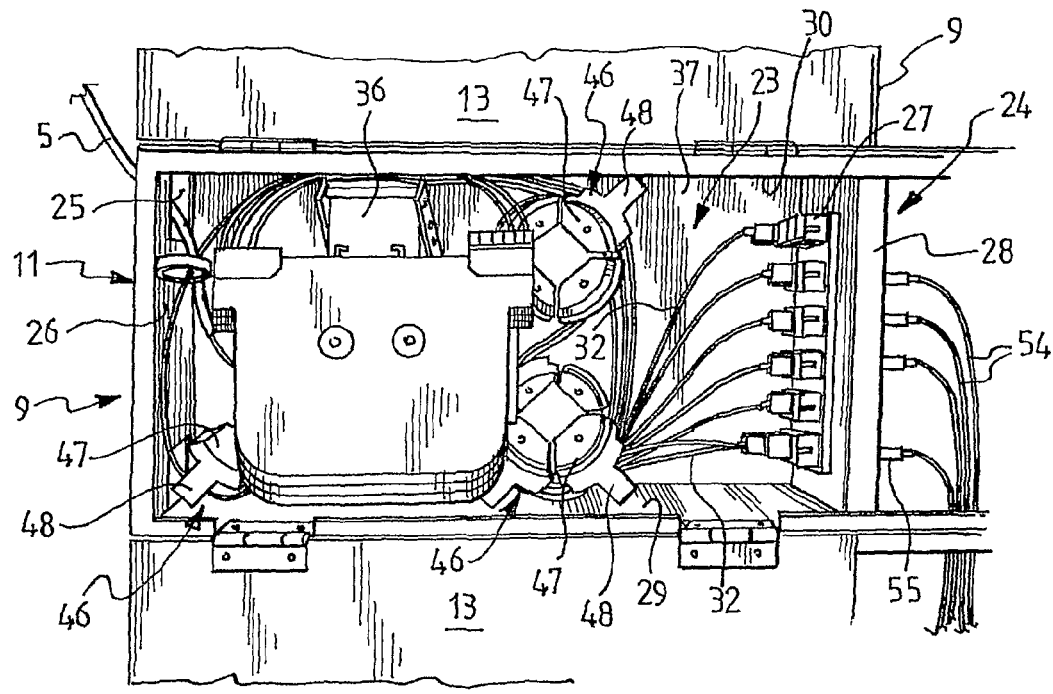
FIG. 4 shows a front view in an enlarged scale of a user module of the modular connection system of FIG. 2.

In FIG. 3, the doors 15 and 16 of the upper operator module 10 and the door 14 of the lower user module 9 are illustrated in open position.

In a preferred embodiment, the closure doors 13, 14, and 15, 16 can be provided with a closure device or with a lock 17, 18 and, respectively, 19, 20 so as to allow a privileged or shared access to the compartments closed by said doors and to the components of the modular connection system 1 housed therein.

Thus, for example, the operator module 10 can be provided with a compartment 21 of proprietary type, closed by the door 15, which may only be accessed by the operator that owns such a module, and a compartment 22 of shared type, closed by the door 16, which may be accessed by all the operators who provide services to the users of the building 4.

The user modules 9, on the other hand, can be provided with compartments 23, 24, both of shared type, which may be accessed by all the operators which provide services to the users of the building 4 for the connection and/or maintenance operations.

The user modules 9, illustrated in greater detail in FIGS. 4-8, comprise at least one passage opening 25 of the connection cables 5 of the user network 3 preferably formed in the box-shaped body 11 at an upper end of the lateral wall 26 of said body 11 opposite to the compartment 24, and a plurality of adapters 27 associated to respective optical fibres of the connection cables 5 of the user network 3.

Preferably, the adapters 27 are mounted in a plurality of adjacent vertical arrays in a separating wall 28 arranged between respective lower 29 and upper 30 walls of the box-shaped body 11 of the user module 9.

To this end, the separating wall 28 is provided with a corresponding plurality of openings 31, for example square openings, adjacent to each other. Each opening 31, therefore, receives a respective adapter 27.

In the preferred embodiment illustrated, the separating wall 28 separates the two compartments 23 and 24 of the user modules 9, so that the outer portions of the adapters 27 may be accessible from the compartment 24.

In the preferred embodiment illustrated, the adapters 27 of the user modules 9 are associated to the respective optical fibres of the connection cables 5 of the user network 3 by means of a plurality of pigtails 32.

Advantageously, the use of the pigtails 32 allows to equip the user network 3 with a plurality of separation points which allow to split the user network 3 into a plurality of separate sectors, independent from each other, facilitating the handling of the user network 3, for example in case of failure.

Preferably, the pigtails 32 are associated to the optical fibres of the connection cables 5 of the user network 3 by splicing the fibres by means of butt splicing according to techniques known to those skilled in the art.

Figure 5:
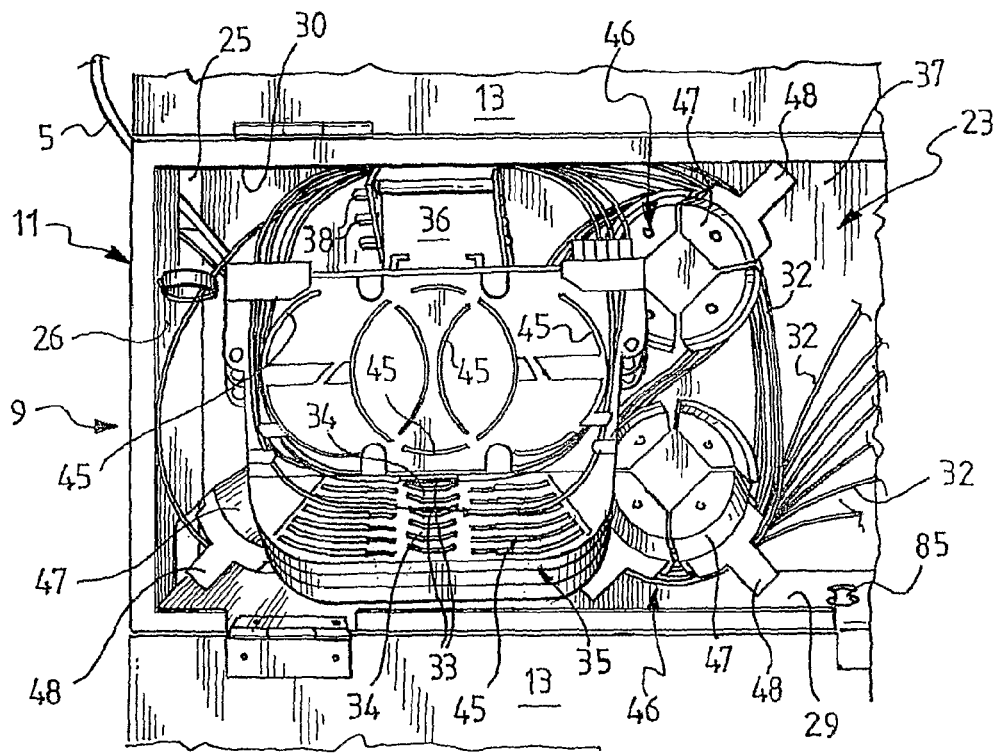
FIG. 5 shows a front view in a further enlarged scale of some details of the user module of FIG. 4.
Figure 6:
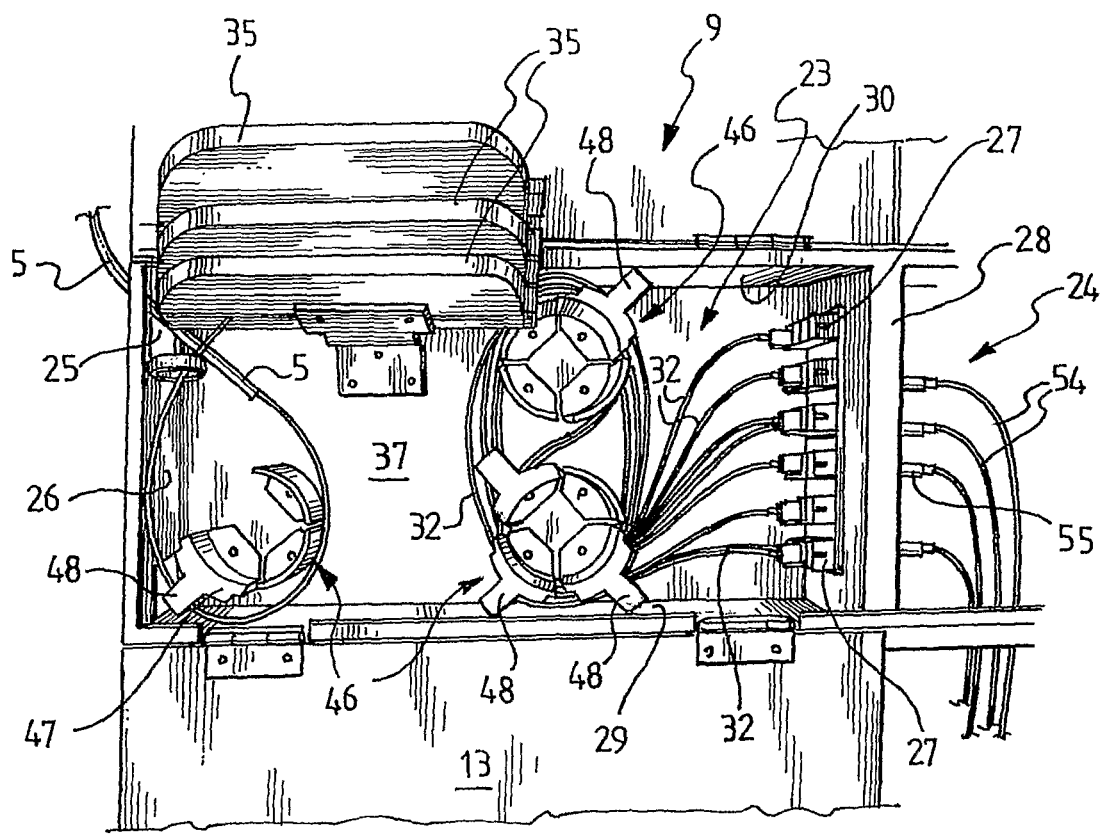
FIG. 6 shows a front view in an enlarged scale of additional details of the user module of FIG. 4.

The splices 33 formed in this way are preferably housed in respective housing seats 34 formed in a plurality of support trays 35, preferably stacked on each other, so as to increase the overall number of users which may be connected by means of a single user module 9 (see FIG. 5).

In this way, it is advantageously possible to adequately protect the splices 33 between the optical fibres of the connection cables 5 of the user network 3 and the pigtails 32.

Preferably, the trays 35 are provided within their inner space with a plurality of guide elements for the optical fibres, all indicated at 45, shaped such that the optical fibres of the connection cable 5 of the user network 3 and the pigtails 32 housed in the user modules 9 cannot undergo direction changes with curvature radii greater than a predetermined minimum value, both in static conditions and in traction conditions induced by handling of the optical fibres.

Thus, the best protection of the optical fibres is ensured against possible bending during the installation and maintenance steps.

To this end, the guide elements 45 (or at least some of them) preferably comprise shaped guide fins perpendicularly projecting from the rear wall of the trays 35 and having a curvature radius greater than the predetermined minimum value. Conveniently, such shaped fins are also arranged such that every fin starts and ends in a direction substantially tangent to the adjacent fins (or to the inlet opening of the fibres into the tray). The minimum curvature radius is thus ensured, even in the case of traction of the optical fibres.

Preferably, the predetermined minimum value of the curvature radius is not less than 30 mm; such value being normally tolerated by the optical fibres.

Preferably, the support trays 35 are rotatably mounted in the user module 9 so as to facilitate the operations of the operator on the underlying structures, such as for example the insertion in the module of the fibres extracted from the connection cable 5 of the user network 3 or of the pigtails 32, as well as the insertion of the splices 33 in an underlying tray 35.

To this end, the trays 35 are hinged to a supporting element 36 fixed to one of the walls of the box-shaped body 11 of the user modules 9, for example to the rear wall 37.

Preferably, the supporting element 36 has a substantially U-shaped body bevelled at a free end, so as to allow both to hinge the trays 35 and to stack the same without having interferences.

More particularly, the trays 35 are hinged to the supporting element 36 by means of a plurality of pins 38 fixed to opposite flaps of the substantially U-shaped body of the supporting element 36, which flaps constitute in this case as many supporting arms of the trays 35 associated to the box-shaped body 11 of the user modules 9.

Figure 12:
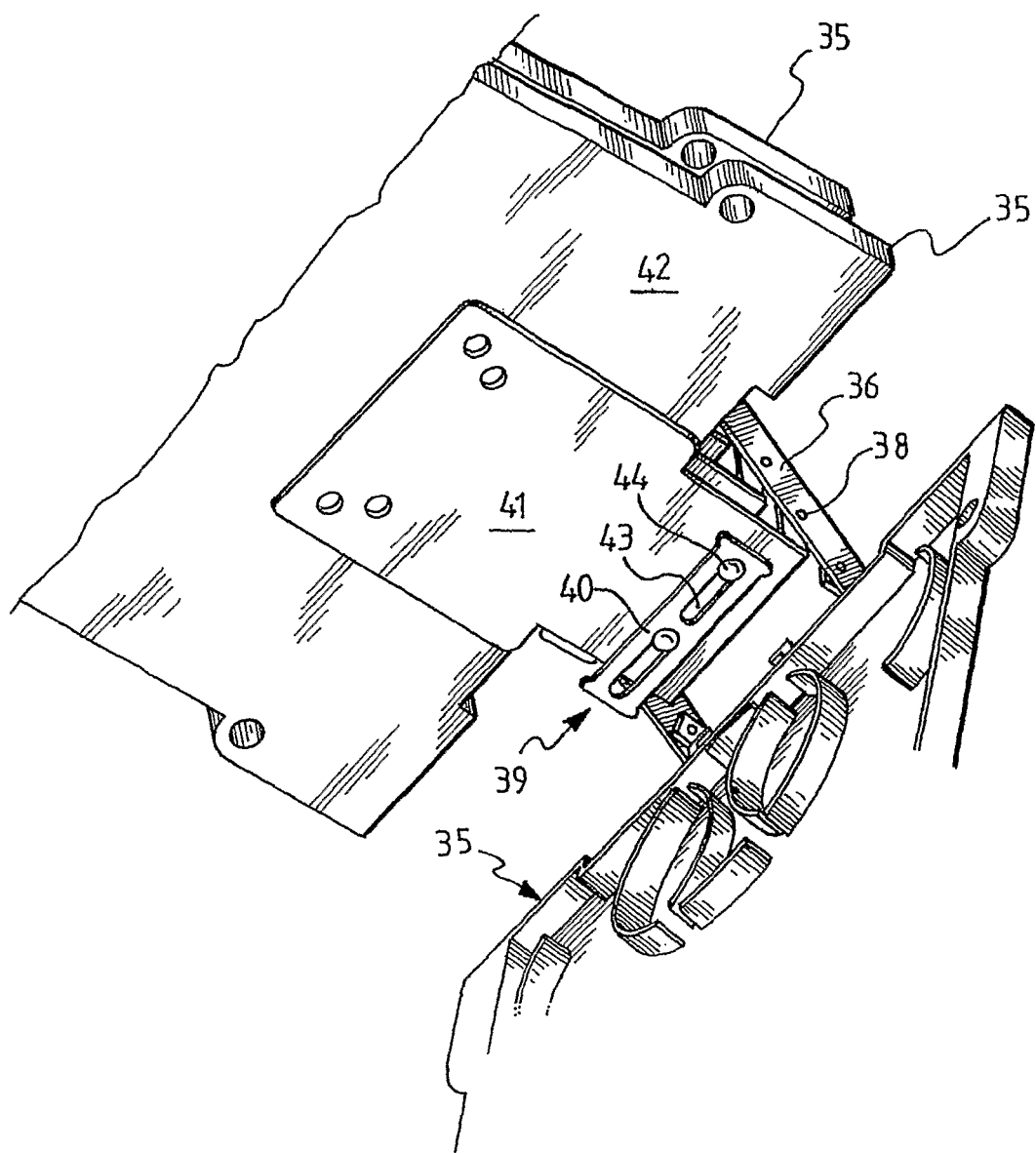
FIG. 12 shows some details of a locking device of the splice support trays of the user modules and of the operator modules of the modular connection system of FIG. 2.

In this preferred embodiment, the user modules 9 are also provided with a locking device 39, illustrated in greater detail in FIG. 12, adapted to maintain the support trays 35 of the splices 33 in a raised position with respect to the rear wall 37 of the user modules 9, so as to facilitate the aforementioned operations of the operator in case of installation/maintenance.

In a possible embodiment, the locking device 39 comprises a bolt 40 slidably mounted on a suitably shaped plate 41 externally fixed to the rear face 42 of the trays 35 and adapted to cooperate in abutment relationship with one of the opposing flaps of the substantially U-shaped body of the supporting element 36.

More particularly, the bolt 40 can be manoeuvred into an operative position illustrated in FIG. 12 in which it projects from the plate 41 and interferes with one of the flaps of the supporting element 36 to maintain the tray 35 in a raised position, and into a non-operative position in which the bolt is completely contained within the outer shape of the plate 41, so as to render the tray 35 free to move back and forth about the pin 38.

Advantageously, the sliding of the bolt 40 can be guided by providing in the body of the bolt a pair of slots 43 adapted to cooperate with respective buttons 44 extending from the plate 41.

In the illustrated embodiment, the user modules 9 further comprise a plurality of winding elements, all indicated at 46, for the optical fibres of the connection cable 5 of the user network 3 and for the pigtails 32 located outside the trays 35.

In an entirely similar manner to the guide elements 45 of the trays 35, the winding elements 46 are preferably shaped such that the optical fibres of the connection cables 5 of the user network 3 and the pigtails 32 housed in the compartment 23 of the user modules 9 cannot undergo direction changes with curvature radii greater than the aforementioned predetermined minimum value of 30 mm, both in static conditions and in traction conditions induced by handling the optical fibres.

To this end, the winding elements 46 preferably comprise shaped fins 47 perpendicularly projecting from the rear wall 37 of the box-shaped body 11 of the user modules 9 and having a curvature radius greater than the predetermined minimum value. Conveniently, the shaped fins 47 are also arranged such that every fin starts and ends in a direction substantially tangent to the adjacent fins 47 (or to the passage opening 25 of the connection cables 5 of the user network 3 in the modules 9). The minimum curvature radius is thus assured even in case of traction of the optical fibres.

In the illustrated embodiment, the winding elements 46 are formed by a number of fins 47 arranged such as to form, according to winding requirements, substantially or partially cylindrical structures (see FIGS. 4-7).

Preferably, the shaped guide fins 47 can comprise retention portions 48 perpendicularly projecting from the fins 47, parallel to and spaced from the rear wall 37 of the box-shaped body 11 of the user modules 9. The retention portions 48 exert the advantageous function of ensuring that the optical fibre portions are effectively maintained in position about the winding elements 46.

Figure 7:
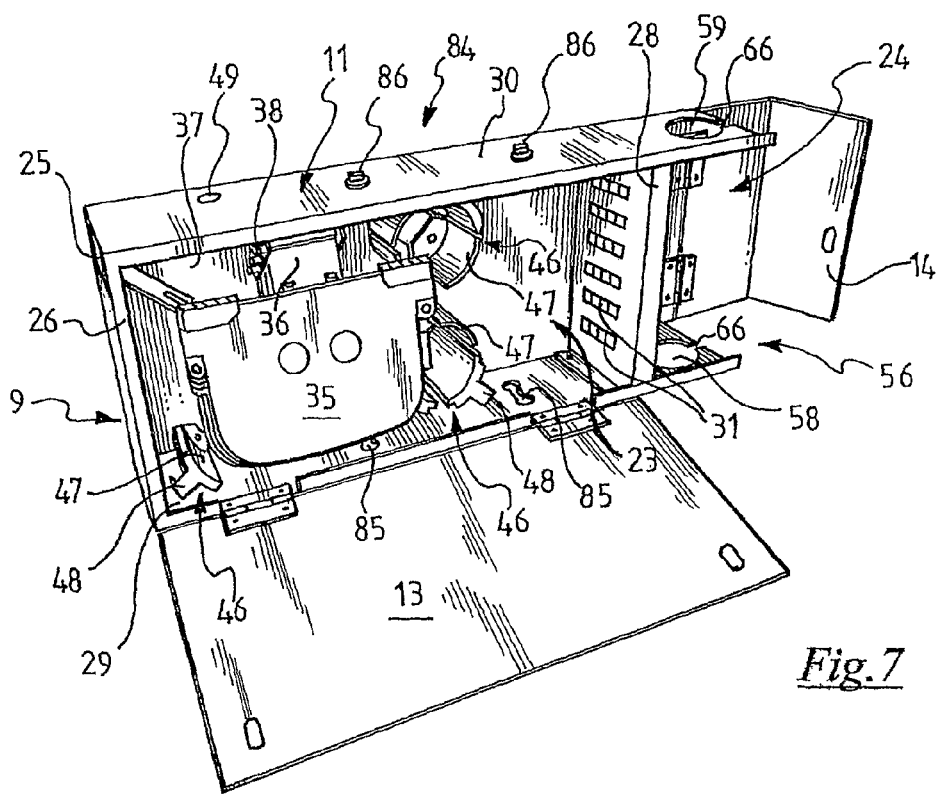
FIG. 7 shows a perspective view of the user module of FIG. 4 without optical fibres.
Figure 8:
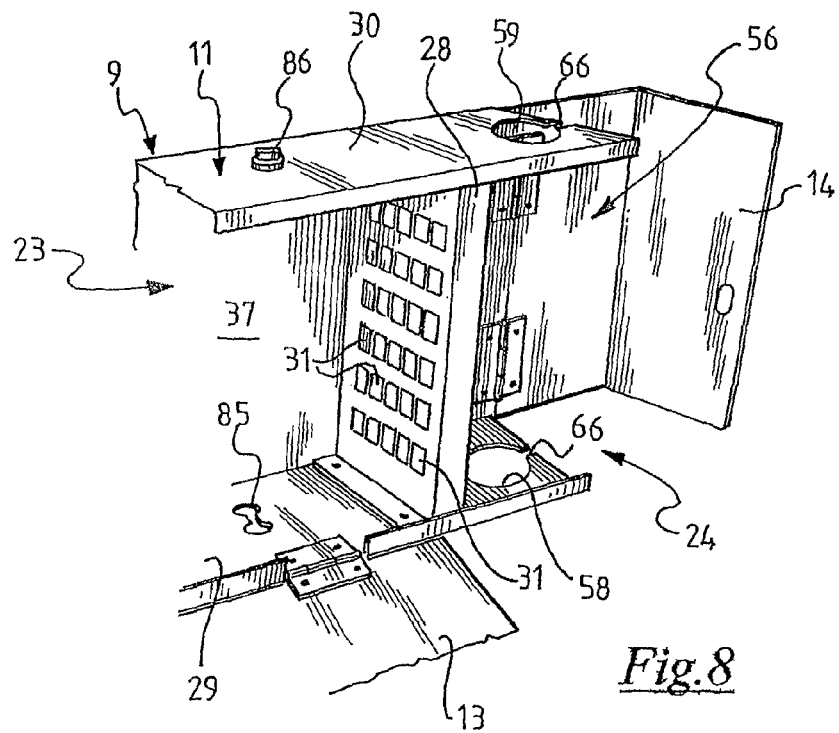
FIG. 8 shows a perspective view in an enlarged scale of some details of an additional embodiment of the user module of the modular connection system of FIG. 2 without optical fibres.

In the illustrated embodiment, the user modules 9 further comprise a pair of openings 49 formed in the lower 29 and upper 30 walls of the box-shaped body 11 of the user modules 9 proximate to the passage opening 25 of the connection cables 5 of the user network 3. In FIG. 7, the opening 49 formed in the upper wall 30 of the box-shaped body 11 is shown.

In this way, within the framework of the modular connection system 1 illustrated, the optical fibres extracted from the connection cable 5 of the user network 3 and exceeding the storing capacity of the upper user module 9 can be advantageously routed into the user module 9 mounted below or above the same.

According to this embodiment, the connection cable 5 of the user network 3 is conveyed into a first user module 9 through the opening 25 and the optical fibres of the connection cable 5 which are not used in said first user module 9 are conveyed into a second user module 9—adjacent to the first—through the aforementioned opening 49. Such a configuration is achieved, for example, when a single connection cable 5 is employed containing a high number of optical fibres, rather than providing for the use of two separate connection cables 5, one for each user module 9.

Both the upper and lower operator modules 10 of the connection system 1 comprise an inlet opening 50 of respective connection cables 51, 52 to the external communication network 2 and owned for example by two different service operators.

The opening 50 is preferably fainted in the box-shaped body 12 of the operator modules 10 at an upper end of a lateral wall 62 of the body 12 opposite to the compartment 22.

Preferably, each of the cables 51, 52 comprises a plurality of optical fibres.

The operator modules 10 further comprise an outlet opening 53 from the compartment 21 of a plurality of fibre optic connection elements 54 (opening visible in FIG. 3 for the upper operator module 10) connected to the external communication network 2 and provided with a connector 55 at one terminal end thereof.

Such opening 53 is preferably formed in a separating wall 63 arranged between respective lower 64 and upper 65 walls of the box-shaped body 12 of the operator modules 10.

According to the invention and as will be better apparent hereinbelow, the external communication network 2 is operatively associated to the user network 3 by means of the connection of the connectors 55 of the fibre optic connection elements 54 with respective selective adapters 27 of said plurality of adapters 27 of the user modules 9.

In the illustrated embodiment, the modular system 1 further comprises a patching channel 56 adapted to receive the fibre optic connection elements 54 of said plurality of connection elements corning out from the operator modules 10 and substantially extending within the user modules 9 and the operator modules 10.

In this way, the user modules 9 and the operator modules 10 form a modular assembly 57 in which the patching channel 56 constitutes an element capable to operatively associate with each other the modules 9, 10 of the modular system 1, housing within its inner space and at the same time protecting the fibre optic connection elements 54 coming out from the operator modules 10.

In the illustrated embodiment, the patching channel 56 extends within the superimposed compartments 22 and 24 of the operator modules 10 and of the user modules 9.

This preferred configuration of the patching channel 56 can be attained thanks to a preferred structure of the user modules 9 which provides for the presence of a pair of substantially coaxial openings 58, 59 formed in the lower 29 and upper 30 walls of the modules 9 at an end portion of the respective box-shaped bodies 11 and to a preferred structure of the operator modules 10 which provides for the presence of a pair of substantially coaxial openings 60, 61 formed in the lower 64 and upper 65 walls of the modules 10 at an end portion of the respective box-shaped bodies 12.

In this way, the patching channel 56 is defined within the compartments 22 and 24 of the modules 9 and 10 by the substantially coaxial openings 58, 59 and 60, 61 (see FIG. 3) so that the channel is completely enclosed within the modular system 1, thereby attaining an effective protection of the fibre optic connection elements 54.

In this way, it is advantageously possible to define the patching channel 56 in a simple and practical manner, in particular when the modules 9, 10 are mounted on top of and adjacent to each other.

In this preferred embodiment of the operator modules 10, furthermore, the substantially coaxial openings 60, 61 formed in the lower 64 and upper 65 walls of the modules 10 constitute as many outlet openings of the fibre optic connection elements 54 from the operator modules 10.

Preferably, the user modules 9 and the operator modules 10 further comprise respective slits, indicated with reference number 66 for the user modules 9 and the reference number 67 for the operator modules 10, formed in the lower 29 and upper 30 walls of the user modules 9 and in the lower 64 and upper 65 walls of the operator modules 10.

Preferably, the slits 66 are extending between the openings 58, 59 of the box-shaped body 11 of the user modules 9 and a peripheral edge of the lower 29 and upper 30 walls of the user modules 9, while the slits 67 are extending between the openings 60, 61 of the box-shaped body 12 of the operator modules 10 and a peripheral edge of the lower 64 and upper 65 walls of the operator modules 10.

Advantageously, the slits 66, 67 constitute as many passage channels which allow to laterally insert the fibre optic connection elements 54 coming out from the operator modules 10 into the patching channel 56 in a simple and quick manner, without having to operate in any manner on the other elements of the modular system 1.

In the illustrated embodiment, the fibre optic connection elements 54 coming out from the operator modules 10 are constituted by respective pigtails associated to respective optical fibres of the connection cables 51, 52 to the external communication network 2.

Similarly to what has been illustrated above with reference to the user module, the use of pigtails advantageously permits to equip the system 1 in its own connection to the external communication network 2 with a plurality of separation points which allow to split the connection with the external communication network 2 into a plurality of separate, independent sectors, allowing an easier handling of the network 2, for example in case of failure.

In this case, the fibre optic connection elements 54 are appropriately spliced to the fibres of the connection cable 51, 52 according to techniques known to those skilled in the art, for example by means of butt splicing.

Figure 11:
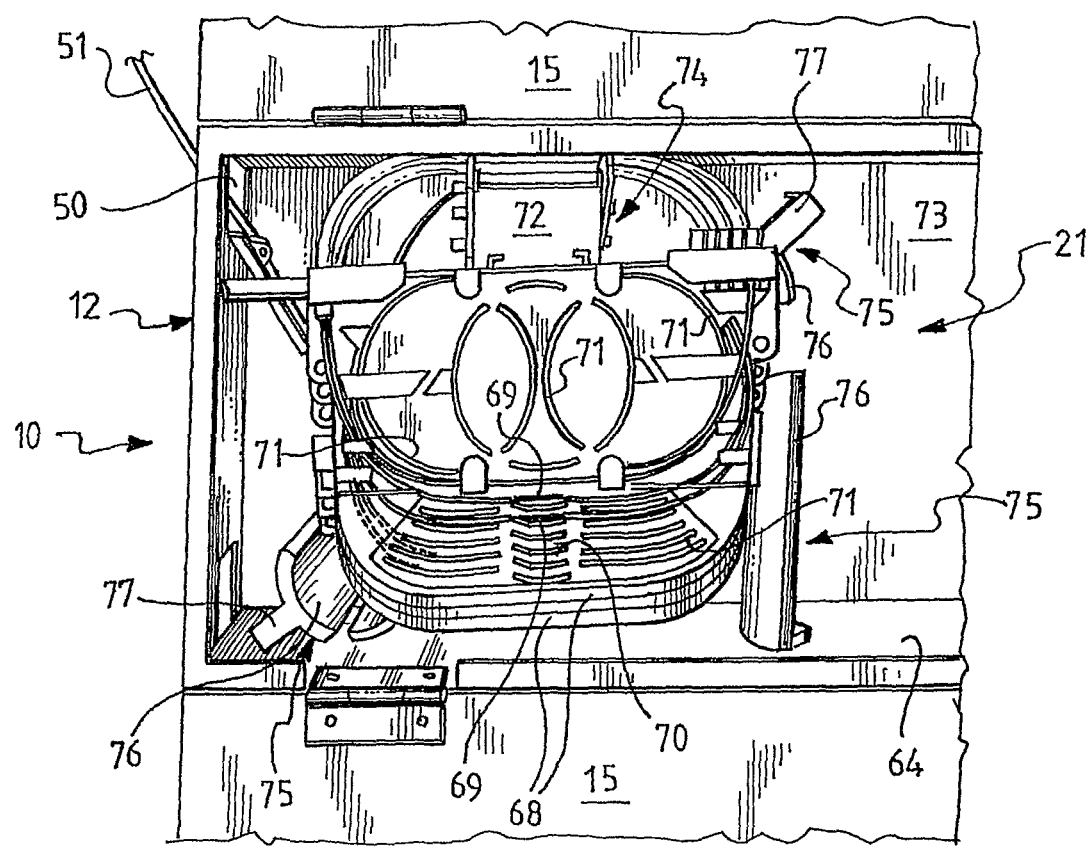
FIG. 11 shows some details of a splice support trays of an operator module of the modular connection system of FIG. 2.

In this preferred embodiment, and similarly to what has been illustrated above with reference to the user modules 9, the operator modules 10 further comprise a respective plurality of support trays 68 of splices 69 between the optical fibres of the connection cables 51, 52 to the external communication network 2 and the fibre optic connection elements 54 (see FIG. 11).

The support trays 68 of the splices 69 are preferably stacked on each other so as to increase the overall number of users which may be connected by means of a single operator module 10.

The splices 69 are preferably housed in respective housing seats 70 formed in the trays 68 in a manner entirely similar to that illustrated above with reference to the trays 35 of the user modules 9.

In this way, it is advantageously possible to adequately protect the splices 69 between the optical fibres of the connection cables 51, 52 to the external communication network 2 and the fibre optic connection elements 54.

Preferably, the trays 68 are provided within their inner space with a plurality of guide elements for the optical fibres, all indicated at 71, shaped in an entirely similar manner to the guide elements 45 of the support trays 35 provided for in the user modules 9.

Also in this case, the support trays 68 of the splices 69 are mounted in a rotatable manner in the operator modules 10 so as to facilitate the operations of the operator on the underlying structures, such as for example the insertion in the module 10 of the fibres extracted from the connection cables 51, 52 to the external communication network 2, of the fibre optic connection elements 54, as well as the insertion of the splices 69 into an underlying tray 68.

In an entirely similar way to the trays 35 of the user modules 9, the trays 68 are hinged to a supporting element 72 fixed to one of the walls of the box-shaped body 12 of the operator modules 10, for example to the rear wall 73 and having, for example, a structure entirely similar (not further described here) to that of the supporting element 36 of the trays 35 housed in the user module 9.

In the illustrated embodiment, the operator modules 10 are also provided with a locking device 74 having, for example, a structure entirely similar to that of the locking device 39 of the trays 35 of the user modules 9, illustrated above with reference to FIG. 12.

Similarly to the user modules 9, the operator modules 10 of the illustrated embodiment further comprise a plurality of winding elements, all indicated at 75, for the optical fibres of the connection cables 51, 52 to the external communication network 2 and for the fibre optic connection elements 54 located outside of the trays 68.

In an entirely similar manner to the winding elements 46 of the user modules 9, the winding elements 75 are preferably shaped such that the optical fibres of the connection cables 51, 52 and the fibre optic connection elements 54 housed in the compartment 21 of the operator modules 10 cannot undergo direction changes with curvature radii greater than the aforementioned predetermined minimum value of 30 mm, both in static conditions and in traction conditions induced by handling the optical fibres.

To this end, the winding elements 75 preferably comprise shaped guide fins 76 perpendicularly projecting from the rear wall 73 or from the lower wall 64 of the box-shaped body 12 of the operator modules 10 and having a curvature radius greater than the predetermined minimum value. Conveniently, the shaped fins 76 are also arranged such that every fin begins and ends in a direction substantially tangent to the adjacent fins 76 (or to the inlet opening 50 of the connection cables 51, 52 in the modules 10). The minimum curvature radius is therefore ensured, also in case of traction of the optical fibres.

Figures 9, 10:
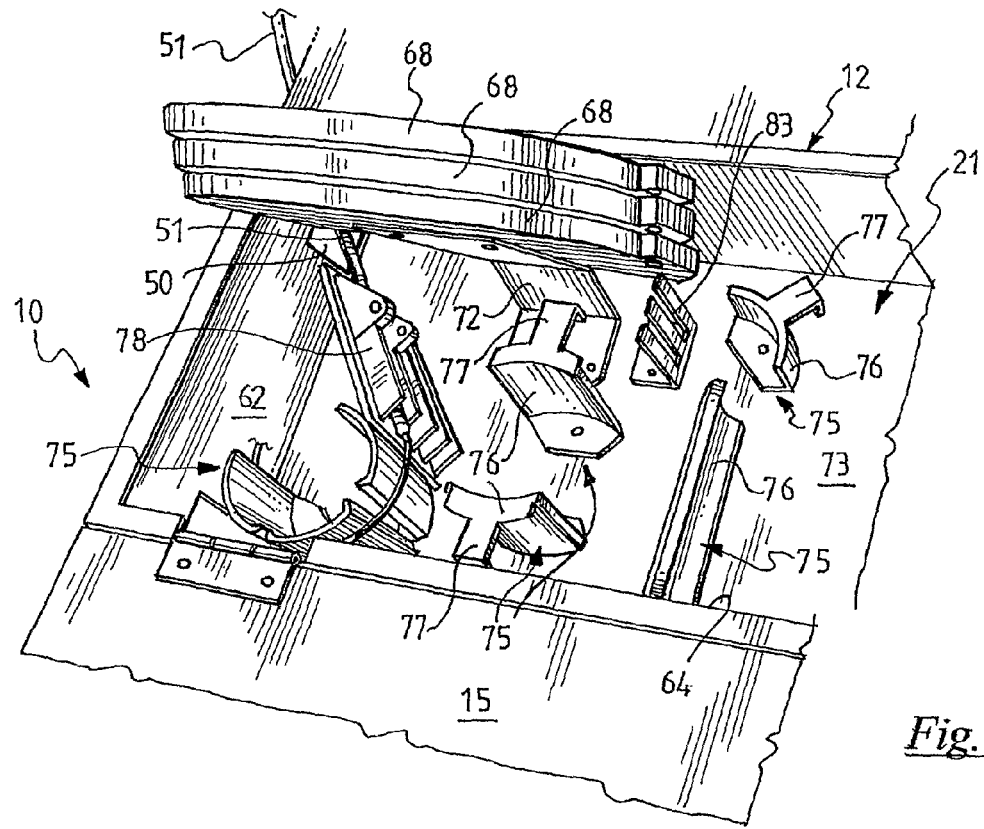
FIG. 9 shows a perspective view of an operator module of the modular connection system of FIG. 2 without optical fibres.
FIG. 10 shows a perspective view in an enlarged scale of some details of the operator module of FIG. 9 with an optical fibre illustrated for exemplifying purposes.

In the preferred embodiment illustrated, some of the winding elements 75 are formed by a number of fins 76 arranged so as to form curvilinear guide structures according to winding requirements (see FIGS. 9-11).

Preferably, some of the shaped guide fins 76 can comprise retention portions 77 perpendicularly projecting from the guide fins 76, parallel to and spaced from the wall from which the fins 76 project, for example as illustrated in the figures from the rear wall 73 of the box-shaped body 12. The retention portions 77 exert the function of ensuring that the optical fibre portions are effectively maintained in position about the winding elements 75.

In the illustrated embodiment, the operator modules 10 further comprise a locking device 78 of the connection cables 51, 52 to the external communication network 2, preferably positioned proximate to the inlet opening 50 of the connection cables.

In this way, it is advantageously possible to prevent that damages may occur to the optical fibres or to the splices 69 housed in the operator modules 10 in case of accidental tractions of the connection cables 51, 52 to the external communication network 2, which tractions may occur for example during street maintenance work.

In the illustrated embodiment, the operator modules 10 further comprise a pair of upper and, respectively, lower guide elements 79, 80 for the fibre optic connection elements 54 coming out from the compartment 21 of the operator modules 10.

Preferably, the guide elements 79, 80 are positioned in the compartment 22 of the operator modules 10 proximate to the opening 53 formed in the separating wall 63 and are preferably formed by substantially curvilinear guide fins having opposite curvature radii for guiding the fibre optic connection elements 54 respectively towards the opening 61 formed in the upper wall 65 of the box-shaped body 12 or towards the opening 60 formed in the lower wall 64 of the box-shaped body 12 of the operator modules 10 (see FIGS. 3 and 9).

Preferably, the guide elements 79, 80 are shaped such that the optical fibres of the fibre optic elements 54 coming out from the operator modules 10 through the opening 60 or through the opening 61 cannot undergo direction changes with curvature radii greater than the aforementioned predetermined minimum value, both in static conditions and in traction conditions induced by handling the elements.

Preferably, at least one of the guide elements 79, 80, for example the element 80, can comprise one or more retention portions 87 perpendicularly projecting from the guide fins and substantially parallel to and spaced from the rear wall 73 of the box-shaped body 12. In this case, the retention portions 87 exert the advantageous function of ensuring that the fibre optic connection elements 54 coming out from the opening 53 are effectively maintained in position about the guide elements 79, 80.

In the illustrated embodiment, the user modules 9 and the operator modules 10 of the connection system 1 further comprise respective elements for storing the fibre optic connection elements 54 coming out from the operator modules.

In this way, it is advantageously possible to prevent that the fibre optic connection elements 54 not connected to the adapters 27 of the user modules 9 may be left loose in the patching channel 56 defined in the modules 9 and 10, with the possibility that the connection elements can get dirty or interfere with the operations of a worker on one of the modules.

More particularly, the user modules 9 are provided with a plurality of elements for storing the connectors 37 of the unused fibre optic connection elements 54, which storing elements are constituted—as better illustrated in FIG. 7—by a plurality of adapters not associated to the optical fibres of the connection cables 5 of the user network 3 or, alternatively, by "dummy" adapters lacking the inner ferrule.

In this case, the connectors 55 of the unused fibre optic connection elements 54 are stored in these storage elements, avoiding that the fibre optic connection elements 54 may be left free to move in the patching channel 56.

In the illustrated embodiment, the operator modules 10 preferably comprise at least one element for storing a portion of the fibre optic connection elements 54 coming out from the opening 53 formed in the separating wall 63 arranged between the lower 64 and upper 65 walls of the operator modules 10, for example formed by a substantially cylindrical support 81 extending from the separating wall 63.

Preferably, the substantially cylindrical support 81 is constituted by a plurality of shaped guide fins 82 perpendicularly projecting from the separating wall 63 of the operator modules 10 and having a curvature radius greater than the aforementioned predetermined minimum value (for example 30 mm) so as not to have undesired bends of the fibres.

Preferably, the support 81 comprises one or more retention portions 88 perpendicularly projecting from the guide fins 82 and substantially parallel to and spaced from the separating wall 63. In this case, the retention portions 88 exert the advantageous function of ensuring that the fibre optic connection elements 54 corning out from the opening 53 are effectively maintained in position about the support 81.

In the illustrated embodiment, the operator modules 10 further comprise a second storage element in addition to the substantially cylindrical support 81, which is formed by a second substantially comb-shaped support 83 adapted to support the fibre optic connection elements 54 associated to the optical fibres of the connection cables 51, 52 to the external communication cable 2 within the compartment 21 of the operator modules 10.

In particular, the second substantially comb-shaped support 83 is advantageously aimed at supporting the connectors 55 possessed by the pre-connectorised optical connection elements 54.

Preferably, the substantially comb-shaped support 83 is perpendicularly extending from the rear wall 73 of the operator modules 10, allowing in this way to store the fibre optic connection elements 54 within the operator modules 10, thereby avoiding that the connection elements may interfere with the other elements outside of the modules in case of subsequent installations.

In the illustrated embodiment, the user modules 9 and the operator modules 10 are mutually associated by means of respective mechanical coupling devices 84 adapted to form a particularly rugged modular assembly 57.

In the embodiment illustrated in the figures, the mechanical coupling devices 84 comprise a coupling of the bayonet type which can be constituted, for example, by appropriately shaped slots 85, formed for example in the lower walls 29 and 64 of the box-shaped bodies 11 and 12 of the modules 9 and 10 adapted to cooperate with respective appropriately shaped pins 86 extending from the upper walls 30, 65 of the box-shaped bodies 11 and 12 in order to associate the modules 9 and 10 to one another.

With reference to the modular system 1 and to the modular assembly 57 described above, a preferred embodiment of a method according to the invention for connecting the external communication network 2 to the user network 3 of the building 4 will now be illustrated.

In a first step of the method, at least one user module is provided, in the illustrated example the two user modules 9, each comprising the adapters 27 for fibre optic connectors. As described above, such modules can be mounted directly on a wall of the building 4 or on a supporting panel associated to a wall of the building 4, and can be associated with each other by means of the mechanical coupling device 84 described above.

In a subsequent step, the connection cables 5 of the user network 3, each comprising a plurality of optical fibres associated to respective selected users, are associated to the user modules 9.

Subsequently, the optical fibres of the connection cables 5 of the user network 3 are associated to the adapters 27 of the user modules 9; preferably, this step is carried out by providing the pigtails 32, by associating the optical fibres of the connection cables 5 of the user network 3 to respective pigtails 32 and by associating the pigtails 32 thus obtained to the adapters 27 of the user modules 9.

In the illustrated embodiment, the optical fibres of the connection cables 5 of the user network 3 are preferably associated to the pigtails 32 by means of the fused fibre splices 33 obtained by means of butt splicing between the fibres carried out in a manner known per se in the art.

The splices 33 are subsequently housed in the respective housing seats 34 formed in the support trays 35 rotatably mounted in the user modules 9. Advantageously, the arrangement in the user modules 9 of rotatable trays 35 provided with respective locking devices 39 allows to operate on each tray 35 without having in the way the other trays which are held in a raised position by one of the aforementioned locking devices 39.

The housing of the splices 33 in the respective splice housing seats 34 is carried out by winding the optical fibres to be spliced about the guide elements 45 formed in the trays 35, in such a manner as to respect the minimum curvature radius of the optical fibres.

In the operative steps mentioned above, the excess of optical fibre is also wound about the winding elements 46.

In a further step of the method, at least one operator module is provided, in the illustrated example the two operator modules 10, each comprising the inlet opening 50 of the connection cables 51, 52 to the external communication network 2, each connection cable comprising a plurality of optical fibres.

In a subsequent step, the connection cables 51, 52 and the fibre optic connection elements 54 provided with a connector at a terminal end thereof are associated to the operator modules 10.

In the illustrated embodiment, the step of associating the fibre optic connection elements 54 to the operator modules 10 preferably comprises the steps of providing a plurality of pigtails and associating the optical fibres of the connection cables 51, 52 to the external communication network 2 to respective pigtails of said plurality of pigtails, thus obtaining fibre optic connection elements 54 connected to the aforementioned external communication network 2.

In the illustrated embodiment, the optical fibres of the connection cables 51, 52 to the external communication network 2 are preferably associated to respective pigtails, so as to obtain the fibre optic connection elements 54 by means of the fused fibre splices 69 obtained by means of butt splicing between the fibres carried out in a manner known per se in the art.

In an similar manner to what has been illustrated above with reference to the user modules 9, the splices 69 are subsequently housed in the respective splice housing seats 70 formed in the support trays 68 rotatably mounted in the operator modules 10. Advantageously, the arrangement in the operator modules 10 of rotatable trays 68 provided with respective locking devices 78 allows to operate on each tray, 68 without having in the way the other trays, which are held in a raised position by one of the aforementioned locking devices 74 of the trays 68.

Also in this case, the housing of the splices 69 in the respective splice housing seats 70 is carried out by winding the optical fibres to be spliced about the guide elements 71 formed in the trays 68 in such a manner as to respect the minimum curvature radius.

In the operating steps described above, the excess of optical fibre is also wound about the winding elements 75.

Once the optical fibres of the connection cable 5 of the user network 3 are associated to the various adapters 27 of the user modules 9 and the optical, fibres of the connection cables 51, 52 of the external communication network 2 are associated to the fibre optic connection elements 54, the method of the invention provides for the step of connecting the connectors 55 of the fibre optic connection elements 54 associated to the operator modules 10 to respective selected adapters 27 of the user modules 9, so as to establish the connection between an optical fibre associated to a selected user and an optical fibre of one of the connection cables 51, 52 of the external communication network 2.

In this way, the two different operators which are connected with respective cables 51 and 52 to the modular connection system 1 or one and the same operator which is connected with two cables 51, 52 to such modular system, are capable of establishing a connection with a selected user who occupies one of the dwelling units of the building 4 in a simple and quick manner.

Advantageously, the step of connecting the connectors 55 to the adapters 27 of the user modules 9 is carried out by placing the fibre optic connection elements 54 coming out from the operator modules 10 in the patching channel 56 extending within the modular system 1 and the fibres turn out to be adequately protected.

Advantageously, the insertion operations of the fibre optic connection elements 54 in the patching channel 56 are facilitated by the slits 66 and 67 formed in the upper and lower walls of the box-shaped body 11 and 12 of the user modules 9 and of the operator modules 10 and which allow an easy access to the openings 58-61 formed in such walls.

In a preferred embodiment, the method further comprises the step of associating the portion of the unconnected fibre optic connection elements 54 to an adapter 27 of the user modules 9 and coming out from the compartment 21 of the operator modules 10 to at least one storage element of the operator modules 10, for example by winding such a portion about the cylindrical supports 81 extending from the separating wall 63.

In this way, it is advantageously possible to collect the unused fibre optic connection elements 54 in an organic mariner, readily available for future use.

According to a further aspect of the connection method according to the invention, a further operator of the external communication network 2 can be quickly connected to the user network 3 of the building 4 by means of the modular connection system 1, even when the user network 3 is already connected to at least one first operator of the external communication network 2.

In this case, the method comprises a first step of providing at least one further operator module 10 comprising a respective inlet opening 50 of a further connection cable to the external shared communication network 2, for example of the cable 52, followed by the step of associating the connection cable 52 to the added operator module 10.

Subsequently and according to procedures similar to those described above, the method comprises the step of associating further fibre optic connection elements 54 connected to the external shared communication network 2 and provided with the connector 55 at a terminal end thereof to the added operator module 10.

The connectors 55 of the fibre optic connection elements 54 are then connected to respective selected adapters 27 of one or both the user modules 9 as a function of the number of users to whom the new operator wishes to connect and as a function of the preceding connection architecture with the users accomplished in the user modules 9.

In a preferred alternative embodiment and if a new operator envisages to replace a preceding operator in the supply of services to a certain user of the building 4, the step of connecting the connectors 55 of the fibre optic connection elements 54 to the adapters 27 of the user modules 9 comprises the steps of disconnecting at least one of the connectors 55 of the fibre optic connection elements 54 associated to the operator module 10 of the preceding operator (and already present in the modular system 1) from a respective adapter 27 of one of the user modules 9 and of connecting the connector 55 of at least one of the fibre optic connection elements 54 associated to the added operator module 10 to this same adapter 27.

It is immediately clear from the above that the take over operations of a new service operator which may be achieved with the modular system 1 and with the method of the invention are therefore very simple and quick.

In the case of take over of a new service operator, the method preferably comprises the step of associating the connector 55 of the fibre optic connection elements 54 associated to the operator module 10 of the previous operator and disconnected from the respective adapter 27 of one of the user modules 9 to an adapter 27 of the same user module 9 which is not associated to optical fibres of the connection cable 5 of the user network 3, or alternatively to a "dummy adapter".

In this way, it is advantageously possible to store the disconnected fibre optic connection element 54 in a manner such that the connection element does not interfere with the other fibre optic connection elements 54 and that the connection element may not be left free to move and be in the way within the patching channel 56.

In a preferred alternative embodiment, the storage of the disconnected fibre optic connection element 54 can be carried out by associating a portion thereof to at least one storage element, for example to the cylindrical support 81 extending from the separating wall 63 of the operator module 10 of the preceding operator.

Advantageously, the incoming operator has the possibility to freely access the compartment 22 of the operator module 10 of a competing operator since, as illustrated above, the patching channel 56 adapted to receive the fibre optic connection elements 54 arranged between the operator modules 10 and the user modules 9 is defined in such a compartment 22.

In a preferred embodiment and similarly to what has been illustrated above, the method of the invention preferably comprises the step of associating the portion of the fibre optic connection elements 54 coming out from the added operator module 10 of the new operator and not connected to an adapter 27 of the user modules 9 to at least one storage element of the added operator module 10, for example by winding such a portion about the cylindrical supports 81 extending from the separating wall 63.

In the various embodiments of the method, it may also be advantageously provided the step of storing the unused fibre optic connection elements 54 within the compartments 21 of the respective operator modules 10, for example by associating such connection elements to the substantially comb-shaped support 83 extending within the box-shaped bodies 12 of the operator modules 10.

In light of what has been illustrated above, it is thus evident that the modular system, the modular assembly and the connection methods of the invention allow to achieve the following advantageous technical effects:

i) attaining, in a simple manner, the maximum operating flexibility in the connection of an external communication network to a user network of a building, ii) allowing each operator to use an operator module of its own, structurally independent from the user module(s) and from other possible operator modules of competing operators, iii) allowing each operator to be connected in a simple and quick manner to each single user of a building, by connecting the fibre optic connection elements of its own module with respective selected adapters of the user module, iv) allowing each operator to carry out the aforementioned connection in a simple and quick manner both in case of a brand new connection, for example during the construction of a building or when a certain dwelling unit is occupied by a user, and in the case of a take over of a previous service operator that one or more users have decided not to use any longer as service provider, v) allowing each operator to be connected to the user(s) without interfering with a pre-existing operator module, also in the case when a previous operator is taken over.

The invention claimed is:

1. A modular system for connecting an external communication network to a user network of a building, comprising:
   A) at least one user module comprising a box-shaped body comprising:
      A1) at least one passage opening of a connection cable of said user network, said cable comprising a plurality of optical fibres associated with respective users; and
      A2) a plurality of adapters associated with respective optical fibres of said connection cable of the user network;
   B) at least one operator module comprising:
      B1) at least one inlet opening of at least one connection cable to said external communication network, said connection cable comprising a plurality of optical fibres; and
      B2) at least one outlet opening of a plurality of fibre optic connection elements connected to the external communication network, a plurality of said fibre optic connection elements being provided with respective connectors at respective terminal ends thereof;
   wherein said at least one user module and said at least one operator module are structurally independent from each other,
   wherein said external communication network is operatively associated with the user network by means of a connection of the respective connectors of the fibre optic connection elements with respective selected adapters of said plurality of adapters of the user module, and
   wherein the adapters are mounted in a separating wall arranged within the box-shaped body of said at least one user module between respective upper and lower walls thereof.

2. The modular system according to claim 1, further comprising at least one patching channel capable of being adapted to receive at least one of said plurality of fibre optic connection elements coming out from said at least one operator module and extending at least in part in said modules.

3. The modular system according to claim 2, wherein said at least one user module and said at least one operator module are provided at an end portion thereof with a pair of substantially coaxial openings formed in respective lower and upper walls of the modules and wherein said at least one patching channel is defined at least in part by said substantially coaxial openings.

4. The modular system according to claim 3, wherein said at least one user module and said at least one operator module further comprise a slit formed in said lower and upper walls of the modules and extending between said openings and a peripheral edge of said walls.

5. The modular system according to claim 1, wherein the adapters of said at least one user module are associated with respective optical fibres of the connection cable of the user network by means of a plurality of pigtails.

6. The modular system according to claim 1, wherein said at least one user module and said at least one operator module are mounted on a supporting wall on top of each other.

7. The modular system according to claim 1, wherein said at least one user module and said at least one operator module are mutually associated at respective facing walls thereof.

8. The modular system according to claim 7, wherein said at least one user module and said at least one operator module are mutually associated by means of at least one mechanical coupling device.

9. The modular system according to claim 8, wherein said at least one mechanical coupling device comprises a bayonet type coupling.

10. The modular system according to claim 5, wherein said at least one user module further comprises at least one support tray of splices between the optical fibres of the connection cable of the user network and respective pigtails.

11. The modular system according to claim 10, wherein said at least one support tray of the splices is rotatably mounted in said at least one user module.

12. The modular system according to claim 11, wherein said at least one user module further comprises a locking device capable of being adapted to maintain said at least one support tray of the splices in a raised position with respect to a rear wall of the user module.

13. The modular system according to claim 1, wherein said at least one user module further comprises at least one storage element for storing unused connectors of the fibre optic connection elements coming out from said at least one operator module.

14. The modular system according to claim 13, wherein said at least one storage element comprises a plurality of adapters not associated with the optical fibres of the connection cable of the user network or a plurality of dummy adapters.

15. The modular system according to claim 5, wherein said at least one user module further comprises at least one winding element for the optical fibres of the connection cable of the user network and/or for the pigtails.

16. The modular system according to claim 1, wherein said at least one user module further comprises a pair of openings formed in respective lower and upper walls of the module.

17. The modular system according to claim 1, wherein the fibre optic connection elements coming out from said at least one operator module comprise, at least in part, respective connection cables to the external communication network.

18. The modular system according to claim 1, wherein said at least one connection cable to the external communication network forms part of said external network.

19. The modular system according to claim 1, wherein the fibre optic connection elements coming out from said at least one operator module are connected to said at least one connection cable to the external communication network by means of a plurality of pigtails associated with respective optical fibres of said connection cable.

20. The modular system according to claim 19, wherein said at least one operator module further comprises at least one support tray of splices between the optical fibres of the connection cable to the external communication network and respective pigtails.

21. The modular system according to claim 20, wherein said at least one support tray of the splices is rotatably mounted in said at least one operator module.

22. The modular system according to claim 21, wherein said at least one operator module further comprises a locking device capable of being adapted to maintain said support tray of the splices in a raised position with respect to a rear wall of the operator module.

23. The modular system according to claim 1, wherein the fibre optic connection elements coming out from said at least one operator module are connected to said at least one connection cable to the external communication network by means of at least one splitter.

24. The modular system according to claim 1, wherein said at least one operator module further comprises at least one storage element for storing a portion of the fibre optic connection elements.

25. The modular system according to claim 24, wherein said at least one storage element comprises a support extending from a separating wall arranged between respective lower and upper walls of the operator module.

26. The modular system according to claim 24, wherein said at least one storage element comprises a substantially comb-shaped support capable of being adapted to support pigtails associated with the optical fibres of the connection cable to the external communication network.

27. The modular system according to claim 20, wherein said at least one operator module further comprises at least one winding element for the optical fibres of the connection cable to the external communication network and/or for the pigtails.

28. The modular system according to claim 1, wherein said at least one operator module further comprises a locking device of the connection cable to the external communication network positioned proximate said at least one inlet opening of said connection cable.

29. The modular system according to claim 1, wherein said at least one operator module further comprises at least one guide element for the fibre optic connection elements coming out from said at least one operator module.

30. A modular assembly for connecting an external communication network to a user network of a building, comprising:
A) at least one user module comprising:
  A1) at least one passage opening of a connection cable of said user network; and
  A2) a plurality of adapters capable of being associated with respective optical fibres of said connection cable of the user network;
B) at least one operator module, structurally independent from said at least one user module, comprising:
  B1) at least one inlet opening of at least one connection cable to said external communication network; and
  B2) at least one outlet opening of a plurality of fibre optic connection elements connected to the external communication network, said connection elements capable of being associated with the adapters of said at least one user module;
wherein said user module is provided with a first and a second compartment;
wherein said operator module is provided with a first and a second compartment;
wherein the second compartment of the user module and the second compartment of the operator module are superimposed with each other; and
wherein said user and operator modules are operatively associated by means of at least one patching channel capable of being adapted to receive at least one of said plurality of connection elements and extending at least in part in said superimposed second compartments of said user and operator modules.

31. The modular assembly according to claim 30, wherein said at least one user module and said at least one operator module are provided at an end portion thereof with a pair of substantially coaxial openings formed in respective lower and upper walls of the modules at said superimposed second compartments thereof and wherein said at least one patching channel is defined at least in part by said substantially coaxial openings.

32. The modular assembly according to claim 31, wherein said at least one user module and said at least one operator module further comprise a slit formed in said lower and upper walls of the modules and extending between said openings and a peripheral edge of said walls.

33. The modular assembly according to claim 30, wherein said at least one user module and said at least one operator module are mounted on a supporting wall on top of each other.

34. The modular assembly according to claim 30, wherein said at least one user module and said at least one operator module are mutually associated at respective facing walls thereof.

35. The modular assembly according to claim 34, wherein said at least one user module and said at least one operator module are operatively associated by means of at least one mechanical coupling device.

36. The modular assembly according to claim 35, wherein said at least one mechanical coupling device comprises a bayonet type coupling.

37. The modular assembly according to claim 30, wherein said at least one user module comprises a plurality of pigtails or a plurality of pigtails associated with respective adapters of said plurality of adapters.

38. The modular assembly according to claim 37, wherein said at least one user module further comprises at least one support tray for splices between the optical fibres of the connection cable of the user network and said pigtails.

39. The modular assembly according to claim 38, wherein said support tray of the splices is rotatably mounted in said at least one user module.

40. The modular assembly according to claim 39, wherein said at least one user module further comprises a locking device capable of being adapted to maintain said at least one support tray of the splices in a raised position with respect to a rear wall of the user module.

41. The modular assembly according to claim 30, wherein said at least one user module further comprises at least one storage element for storing the fibre optic connection elements capable of being associated with the adapters of said at least one user module.

42. The modular assembly according to claim 41, wherein said at least one storage element comprises a plurality of adapters or a plurality of dummy adapters.

43. The modular assembly according to claim 30, wherein said at least one user module further comprises at least one winding element for optical fibres and/or for pigtails.

44. The modular assembly according to claim 30, wherein said at least one user module further comprises a pair of openings formed in respective lower and upper walls of the module.

45. The modular assembly according to claim 30, wherein said at least one operator module comprises a plurality of pigtails capable of being adapted to associate with respective optical fibres of said connection cable to the external communication network.

46. The modular assembly according to claim 45, wherein said at least one operator module further comprises at least one support tray for splices between the optical fibres of the connection cable to the external communication network and said pigtails.

47. The modular assembly according to claim 46, wherein said at least one support tray of the splices is rotatably mounted in said at least one operator module.

48. The modular assembly according to claim 47, wherein said at least one operator module further comprises a locking device capable of being adapted to maintain said at least one support tray of the splices in a raised position with respect to a rear wall of the operator module.

49. The modular assembly according to claim 46, wherein said at least one operator module further comprises at least one winding element for the optical fibres of the connection cable to the external communication network and/or for the pigtails.

50. The modular assembly according to claim 30, wherein said at least one operator module comprises at least one splitter for connecting the fibre optic connection elements to the external communication network.

51. The modular assembly according to claim 30, wherein said at least one operator module further comprises at least one storage element for storing a portion of the fibre optic connection elements.

52. The modular assembly according to claim 51, wherein said at least one storage element comprises a support extending from a separating wall arranged between respective lower and upper walls of the operator module.

53. The modular assembly according to claim 51, wherein said at least one storage element comprises a substantially comb-shaped support capable of being adapted to support pigtails capable of being adapted to associate with the optical fibres of the connection cable to the external communication network.

54. The modular assembly according to claim 30, wherein said at least one operator module further comprises a locking device of the connection cable to the external communication network positioned proximate said at least one inlet opening of said connection cable.

55. The modular assembly according to claim 30, wherein said at least one operator module further comprises at least one guide element for the fibre optic connection elements.

* * * * *

UNITED STATES PATENT AND TRADEMARK OFFICE
CERTIFICATE OF CORRECTION

| | | Page 1 of 1 |
|---|---|---|
| PATENT NO. | : 8,750,667 B2 | |
| APPLICATION NO. | : 12/676829 | |
| DATED | : June 10, 2014 | |
| INVENTOR(S) | : Le Dissez | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this
Twenty-seventh Day of October, 2015

Michelle K. Lee
*Director of the United States Patent and Trademark Office*